United States Patent
Katayama et al.

(10) Patent No.: US 9,868,639 B2
(45) Date of Patent: Jan. 16, 2018

(54) METHOD FOR MANUFACTURING CARBONACEOUS FILM AND METHOD FOR MANUFACTURING GRAPHITE FILM

(71) Applicant: KANEKA CORPORATION, Osaka-shi, Osaka (JP)

(72) Inventors: Satoshi Katayama, Settsu (JP); Yusuke Ohta, Settsu (JP); Takashi Inada, Settsu (JP); Makoto Kutsumizu, Settsu (JP); Yasushi Nishikawa, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 0 days.

(21) Appl. No.: 14/387,069

(22) PCT Filed: Sep. 19, 2013

(86) PCT No.: PCT/JP2013/075312
§ 371 (c)(1),
(2) Date: Sep. 22, 2014

(87) PCT Pub. No.: WO2014/046187
PCT Pub. Date: Mar. 27, 2014

(65) Prior Publication Data
US 2015/0044364 A1 Feb. 12, 2015

(30) Foreign Application Priority Data

Sep. 19, 2012 (JP) .................................. 2012-205747

(51) Int. Cl.
| | | |
|---|---|---|
| C01B 31/02 | (2006.01) | |
| C01B 31/04 | (2006.01) | |
| B32B 18/00 | (2006.01) | |
| C04B 35/52 | (2006.01) | |
| C04B 35/524 | (2006.01) | |
| C04B 35/622 | (2006.01) | |
| C01B 32/05 | (2017.01) | |
| C01B 32/20 | (2017.01) | |

(52) U.S. Cl.
CPC .............. *C01B 31/04* (2013.01); *B32B 18/00* (2013.01); *C01B 32/05* (2017.08); *C01B 32/20* (2017.08); *C04B 35/522* (2013.01); *C04B 35/524* (2013.01); *C04B 35/62218* (2013.01); *C04B 2235/6562* (2013.01); *C04B 2235/9607* (2013.01); *C04B 2237/363* (2013.01)

(58) Field of Classification Search
CPC ..................................................... C01B 32/05
See application file for complete search history.

(56) References Cited

U.S. PATENT DOCUMENTS

| | | | | |
|---|---|---|---|---|
| 4,100,004 A | * | 7/1978 | Moss ........................ | D01F 9/22 |
| | | | | 156/181 |
| 4,284,615 A | * | 8/1981 | Maruyama .................. | 423/447.4 |
| 4,816,242 A | * | 3/1989 | Venner ...................... | D01F 9/16 |
| | | | | 423/447.1 |
| 5,091,025 A | | 2/1992 | Murakami et al. | |
| 5,449,507 A | | 9/1995 | Murakami et al. | |
| 5,928,986 A | * | 7/1999 | Parmentier ............. | C01B 31/10 |
| | | | | 423/447.6 |
| 7,339,736 B2 | * | 3/2008 | Trapani ................ | G02B 5/3083 |
| | | | | 264/1.34 |
| 7,927,575 B2 | * | 4/2011 | Ko ........................ | D03D 15/00 |
| | | | | 156/89.26 |
| 2014/0004033 A1 | | 1/2014 | Ohta et al. | |

FOREIGN PATENT DOCUMENTS

| | | |
|---|---|---|
| JP | 1-203208 A | 8/1989 |
| JP | 3-16907 A | 1/1991 |
| JP | 3-75211 A | 3/1991 |
| JP | 4-149013 A | 5/1992 |
| JP | 4-202056 A | 7/1992 |
| JP | 5-17118 A | 1/1993 |
| JP | 5-43213 A | 2/1993 |
| JP | 2004-299937 A | 10/2004 |
| JP | 2009-203153 A | 9/2009 |
| JP | 2010-126691 A | 6/2010 |
| JP | 2011-219314 A | 11/2011 |
| WO | WO 2012/128187 A1 | 9/2012 |

OTHER PUBLICATIONS

International Search Report, dated Dec. 17, 2013, for International Application No. PCT/JP2013/075312.
International Preliminary Report on Patentability and the English translation of the Written Opinion of the International Searching Authority (Forms PCT/IB/338, PCT/IB/373 and PCT/ISA/237), dated Apr. 2, 2015, for International Application No. PCT/JP2013/075312.

* cited by examiner

*Primary Examiner* — Stuart Hendrickson
(74) *Attorney, Agent, or Firm* — Birch, Stewart, Kolasch & Birch, LLP

(57) ABSTRACT

There has been a problem that wrinkles easily occur on a carbonaceous film produced by the use of a continuous production method and on a graphite film obtained by heat-treating the carbonaceous film. In the present invention, heating treatment is carried out on a polymeric film while applying pressure to the polymeric film in the film thickness direction with the use of a continuous carbonization apparatus. This makes it possible to obtain a carbonaceous film and a graphite film in which wrinkling is reduced.

8 Claims, 7 Drawing Sheets

METHOD FOR MANUFACTURING CARBONACEOUS FILM AND METHOD FOR MANUFACTURING GRAPHITE FILM

TECHNICAL FIELD

The present invention relates to a carbonaceous film and a graphite film obtained by using the carbonaceous film.

BACKGROUND ART

As a method for obtaining a graphite film with a polymer burning method, a batch method (see Patent Literature 1) and a continuous production method (see Patent Literatures 2 and 3) are known. It is disclosed in Patent Literature 3 that the continuous production method is advantageous because of its production efficiency higher than that of the batch method.

CITATION LIST

Patent Literature

[Patent Literature 1]
Japanese Patent Application Publication Tokukaihei No. 3-75211 A (Publication date: Mar. 29, 1991)
[Patent Literature 2]
Japanese Patent Application Publication Tokukaihei No. 4-149013 A (Publication date: May 22, 1992)
[Patent Literature 3]
Japanese Patent Application Publication Tokukai No. 2004-299937 A (Publication date: Oct. 28, 2004)

SUMMARY OF INVENTION

Technical Problem

However, the methods disclosed in Patent Literatures 2 and 3 have a problem that wrinkles occur on a film 11 after a continuous carbonization step in producing a carbonaceous film by heat-treating a polymeric film in the continuous production method as illustrated in FIG. 1.

An object of the present invention is to solve such a problem, i.e., to provide a carbonaceous film in which the wrinkling is reduced.

Solution to Problem

That is, the present invention relates to a method for manufacturing a carbonaceous film with use of a continuous carbonization apparatus, the method including the step of: applying pressure to a polymeric film and/or a raw material carbonaceous film, of which the carbonaceous film is to be made, in a film thickness direction at a temperature profile at least partially falling within a range of 550° C. or higher and 800° C. or lower while the polymeric film and/or the raw material carbonaceous film is being transported.

Advantageous Effects of Invention

According to the present invention, it is possible to obtain a carbonaceous film in which the wrinkling is reduced.

DESCRIPTION OF EMBODIMENTS

Figure 1:
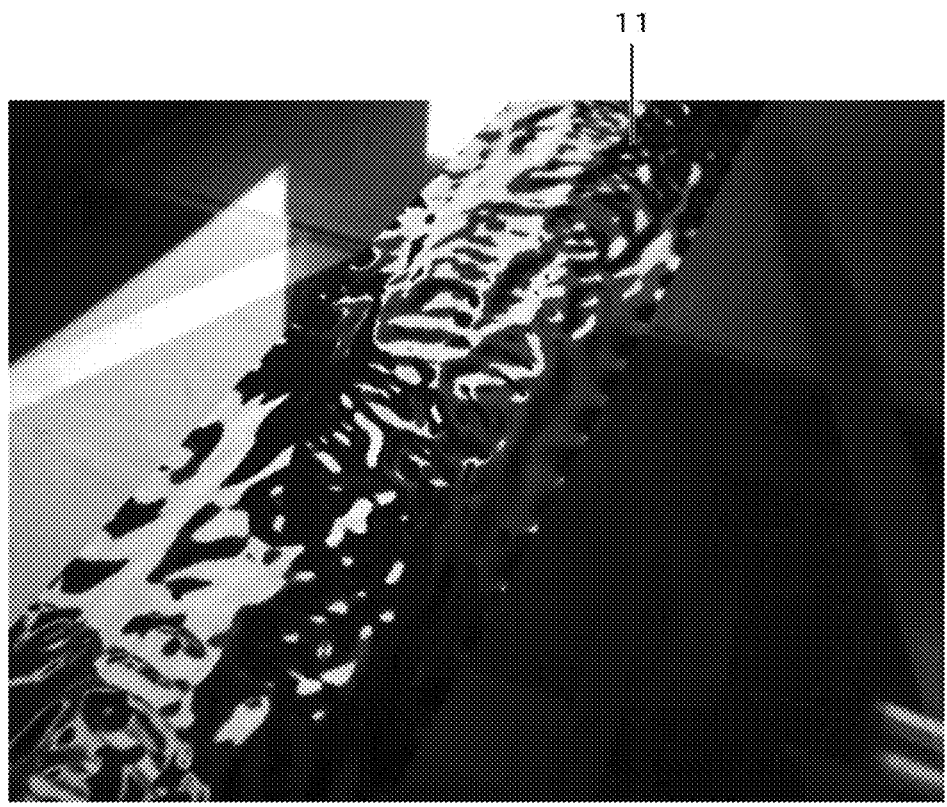
FIG. 1 illustrates a carbonaceous film which has been heat-treated with a conventional continuous production method.

The present invention relates to (i) the method for manufacturing a carbonaceous film with use of a continuous carbonization apparatus, the method including the step of: applying pressure to a polymeric film and/or a raw material carbonaceous film, of which the carbonaceous film is to be made, in a film thickness direction at a temperature profile at least partially falling within a range of 550° C. or higher and 800° C. or lower while the polymeric film and/or the raw material carbonaceous film is being transported and to (ii) the method for manufacturing a graphite film, the method including the step of: heat-treating a carbonaceous film at a temperature of 2400° C. or higher, the carbonaceous film having been prepared by the method.

Note that an x-axis, a y-axis, and a z-axis in the drawings define respective directions in a three dimensional space in each of the drawings. In this specification, a length of a film in the x-axis direction is also referred to as "length", a length of the film in the y-axis direction is also referred to as "width", and a length of the film in the z-axis direction is also referred to as "thickness". Moreover, in this specification, the x-axis direction is also referred to as a "length direction" of the film, the y-axis direction is also referred to as a "width direction" of the film, and the z-axis direction is also referred to as a "thickness direction" of the film. Furthermore, the x-axis direction is also defined as a film transporting direction.

<Continuous Carbonization Apparatus>

Figure 2:
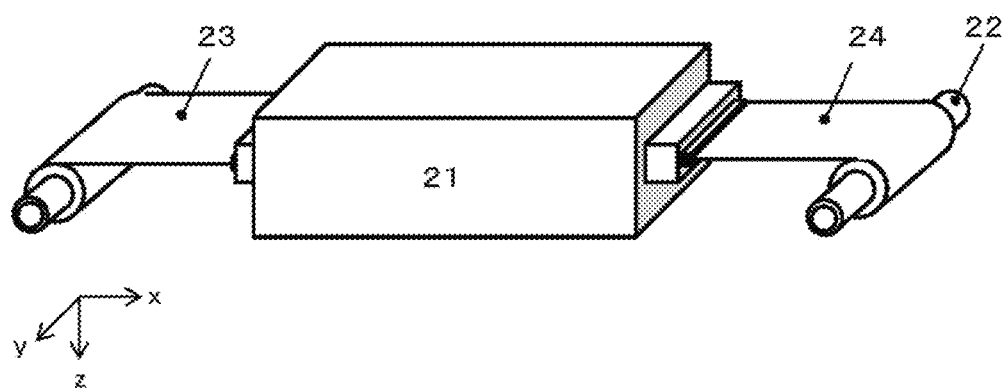
FIG. 2 is a schematic view illustrating a continuous carbonization step of the present invention.

The continuous carbonization apparatus includes (i) a film transporting device 22 which transports a long film 23 made up of a polymeric film and/or a raw material carbonaceous film and (ii) a heating treatment device 21 which has an inlet and an outlet, and the continuous carbonization apparatus can continuously produce a carbonaceous film 24 by a combination of the film transporting device 22 and the heating treatment device 21 as illustrated in, for example, FIG. 2. The term "continuously" indicates, for example, that a raw material is heat-treated while (i) the polymeric film and/or the raw material carbonaceous film, each of which is the raw material, are being carried in the heating treatment device 21 and simultaneously (ii) an obtained carbonaceous film being carried out of the heating treatment device 21. The step of obtaining a carbonaceous film by the use of the continuous carbonization apparatus is referred to as "continuous carbonization step". In the continuous carbonization step, the heating treatment is preferably carried out on the polymeric film and/or the raw material carbonaceous film without stopping the transportation.

A wind-up device and/or a wind-off device can be provided as a device(s) for transporting the polymeric film and/or the raw material carbonaceous film. The wind-up device is located downstream of the heating treatment device and the wind-off device is located upstream of the heating treatment device. That is, the continuous carbonization apparatus can be configured such that, for example, the long film made up of the polymeric film and/or the raw material carbonaceous film is transported by the wind-off device and/or the wind-up device so that the long film is carried in the heating treatment device and a carbonaceous film, which has been subjected to heating treatment, is carried out of the heating treatment device.

Note that, according to the present invention, the film made up of the polymeric film and/or the raw material carbonaceous film is pressurized in a thickness direction of the film while being transported, as later described. Therefore, tension by friction occurs on a surface of the film made up of the polymeric film and/or the raw material carbonaceous film.

As above described, the present invention in which the continuous carbonization apparatus is used is different from the batch method disclosed in Patent Literature 1.

<Polymeric Film>

The polymeric film used in the present invention is, for example, a polymeric film of at least one selected from the group consisting of polyimide, polyamide, polyoxadiazole, polybenzothiazole, polybenzobisazole, polybenzoxazole, polybenzobisoxasole, polyparaphenylene vinylene, polybenzimidazole, polybenzobisimidazole, and polythiazole, in view of strength and a decomposition temperature of a film in the heating treatment.

As the polymeric film, a polyimide film is particularly preferable. This is because the polyimide film can provide development of a graphite layer structure in the carbonization step and the graphitizing step more easily than other polymeric films which are made of other organic materials, in view of film strength, thermal decomposition temperature, and birefringence which serves as an indicator of molecular orientation.

According to the present invention, the polymeric film encompasses a film which has already lost weight with a weight loss ratio of lower than 10% by being heat-treated. Meanwhile, a film which has lost, by being heat-treated, weight with a weight loss ratio of 10% or higher is referred to as "carbonaceous film". Moreover, a carbonaceous film which is a raw material for a carbonaceous film obtained in the present invention is referred to as "raw material carbonaceous film". The raw material carbonaceous film is a carbonaceous film which has been obtained through heat-treatment of polymeric film to reduce its weight by a weight loss ratio of 10% or higher and 28% or lower, as compared with the weight of the polymeric film. Note that a method for producing the raw material carbonaceous film is not limited to a particular one and can be a batch method or a continuous production method.

Note that, in this specification, "polymeric film and raw material carbonaceous film" indicates a film made up of a polymeric film part and a raw material carbonaceous film part.

Hereinafter, (i) a polymeric film and/or a raw material carbonaceous film and/or (ii) a carbonaceous film obtained from the polymeric film and/or the raw material carbonaceous film are collectively referred to also as "film".

In this specification, the "method for manufacturing a carbonaceous film" means a method for obtaining a carbonaceous film which has lost weight by 10% or higher as compared with a weight of its raw material, i.e., a polymeric film and/or a raw material carbonaceous film by heat-treating the polymeric film and/or the raw material carbonaceous film. That is, the present invention encompasses a method for manufacturing a carbonaceous film which has lost weight by 10% or higher through heating treatment of a raw material that is a polymeric film which has not been heat-treated. Moreover, the present invention encompasses also a method for manufacturing a carbonaceous film which has lost weight, by being heat-treated, by 10% or higher as compared with a weight of its row material, i.e., a polymeric film which has already lost weight, by being heat-treated, by lower than 10% as compared with its weight before being heat-treated. Furthermore, the present invention encompasses also a method for manufacturing a carbonaceous film which has lost weight, by being heat-treated, by 10% or higher as compared with a weight of its row material, i.e., a carbonaceous film (i.e., a raw material carbonaceous film) which has been obtained through heat treatment to reduce weight by 10% or higher and 28% or lower as compared with a weight of a polymeric film before being heat-treated.

Note that the weight loss ratio of the raw material carbonaceous film is calculated as follows:

That is, the weight loss ratio of the raw material carbonaceous film is calculated from (i) a weight loss ratio A of a raw material carbonaceous film which has been heat-treated up to a temperature at which a weight of the raw material carbonaceous film becomes constant (i.e., weight loss stops) and (ii) a weight loss ratio B of a polymeric film which has been heat-treated for the first time up to a temperature at which a weight of the polymeric film becomes constant (i.e., weight loss stops).

The temperature at which the weight becomes constant (i.e., weight loss stops) is determined depending on a material of the polymeric film. In a case of polyimide, the temperature is 1400° C. or higher.

The weight loss ratio B is determined depending on a material of the polymeric film. In a case of polyimide, the weight loss ratio B is 52% when polyimide is heat-treated up to 1400° C.

<Birefringence>

According to the present invention, birefringence of the polymeric film is not limited to a particular one. However, in a case where the birefringence is 0.08 or higher, carbonization and graphitization of a film progress more easily, and accordingly a graphite film in which a graphite layer has been developed can be easily obtained. In particular, as in the present invention, in a case where a continuous carbonization step is carried out in which molecular orientation of a polymeric film is easily disordered, higher birefringence is preferable. The birefringence of the polymeric film is preferably 0.08 or higher, more preferably 0.10 or higher, further preferably 0.12 or higher, particularly preferably 0.14 or higher. Note that the birefringence means a difference (TE–

TM) between a refractive index (TE) in an arbitrary direction along a film surface and a refractive index (TM) in a thickness direction.

<Film Transporting Device>

According to the present invention, examples of the method for transporting a film with the continuous carbonization apparatus encompass a method of drawing a film with a wind-up device, a method of feeding in a film with a wind-off device, and a method of transporting a film along a carrier belt, etc. According to the present invention, it is preferable to carry out heating treatment on a film which is drawn by the wind-up device while controlling tension and a transporting speed of the film, in view of strength of the film and the control in transporting the film. As an adjusting device for controlling the tension and the transporting speed, for example, a method can be employed in which torque is applied to a rotation shaft of the wind-up device as illustrated in FIG. 2.

In a case where tension is applied to a film in the continuous carbonization step of the present invention, tensile strength applied to the film falls within a range of 0 kgf/cm$^2$ or higher and 400 kgf/cm$^2$ or lower, preferably 5 kgf/cm$^2$ or higher and 200 kgf/cm$^2$ or lower, more preferably 30 kgf/cm$^2$ or higher and 70 kgf/cm$^2$ or lower. No particular lower limit is set in the present invention but the tension applied to the film is effective for inhibiting meandering and wrinkling. In a case where the tensile strength is 400 kgf/cm$^2$ or smaller, it is possible to inhibit (i) breakage and elongation of the film caused by excessive tension and (ii) wrinkles caused by tension.

<Heating Treatment Device>

The heating treatment device has a heating space inside thereof. An inside of the heating space is preferably vacuum or an inert gas atmosphere of, for example, nitrogen or argon. The vacuum or the inert gas atmosphere is preferably maintained at a temperature falling within a range of 400° C. or higher and 1800° C. or lower, more preferably a range of 300° C. or higher and 1800° C. or lower. The carbonaceous film is reacted with oxygen in the heating treatment, and it is therefore possible to enhance stability by adjusting the atmosphere from a lower temperature. Provided that the temperature is 1800° C. or lower, the heating treatment can be carried out in any of the vacuum, the nitrogen atmosphere, and the argon atmosphere, and it is therefore preferable to set the temperature of the heating space to 1800° C. or lower. According to the present invention, the temperature of the heating space indicates a highest temperature of a film which comes nearest to a heater while passing through the heating space.

The number of heating spaces can be one (1) or a plural number. In a case where the plurality of heating spaces are provided, for example, (i) temperature distribution is formed by a plurality of heating spaces (i.e., a heating space 1 33, a heating space 2 34, and a heating space 3 35) so that thermal decomposition of a film 37 is controlled (see FIG. 3) or (ii) a cooling space 43 is provided between a plurality of heating spaces (see FIG. 4). FIG. 4 illustrates a case 41 in which no cooling space is provided and a case 42 in which cooling spaces are provided. In a case where the plurality of heating spaces are provided, the number and temperatures of the plurality of heating spaces are determined so that a weight loss ratio of a film by passing through each of the plurality of heating spaces falls within a range of 0% or higher and 25% or lower, preferably 0.5% or higher and 20% or lower, more preferably 1% or higher and 15% or lower, further preferably 1.5% or higher and 10% or lower, most preferably 2% or higher and 5% or lower, in order to inhibit wrinkling and breakage of the film, which are caused by rapid thermal decomposition. It is preferable that the weight loss ratio is as lower as possible. In particular, in a case where the weight loss ratio is 25% or lower, shrinkage of the film can be moderated, and this makes it difficult for wrinkles to occur. Moreover, even in a case where the weight loss ratio is 0%, the film is softened by heat, and it is therefore possible to reduce wrinkling. Specifically, a difference in temperature between adjacent heating spaces is a range of 0° C. or higher and 200° C. or lower, preferably a range of 3° C. or higher and 100° C. or lower, more preferably a range of 5° C. or higher and 50° C. or lower, further preferably a range of 10° C. or higher and 30° C. or lower. Even in a case where the difference in temperature between adjacent heating spaces is 0° C., thermal decomposition can progress provided that a longer heating treatment time is secured. Moreover, provided that the difference in temperature is 200° C. or lower, it is possible to reduce a degree of shrinkage of the carbonaceous film at a time, and this allows inhibition of wrinkling. Here, the phrase "adjacent heating spaces" indicates that the film sequentially passes through two heating spaces, and encompasses a case where two heating spaces are located away from each other and a case where the film passes through the same heating space twice.

Figure 3:
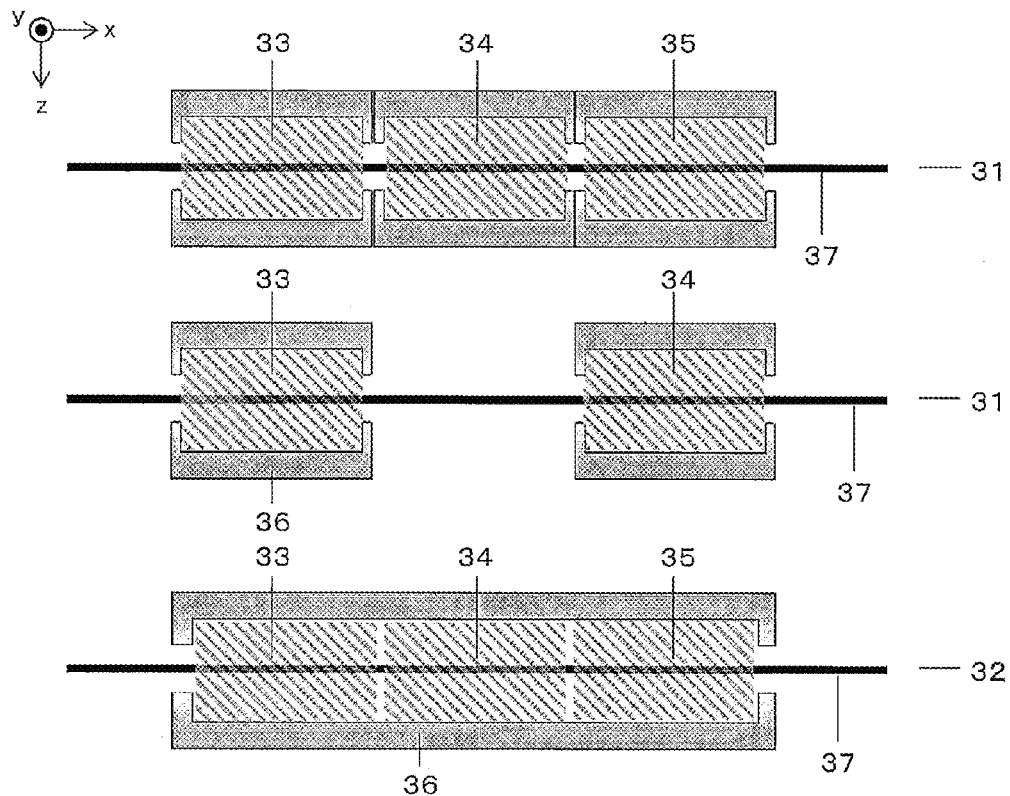
FIG. 3 is a schematic view of a heating treatment device.
Figure 4:
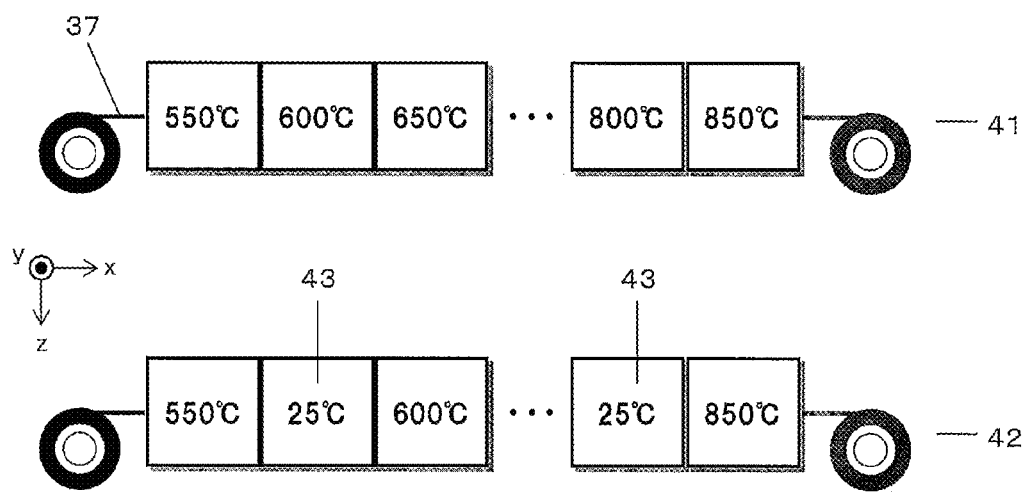
FIG. 4 illustrates an example of setting temperatures of heating spaces.

The plurality of heating spaces can be (i) physically separated from each other as indicated by a reference numeral 31 in FIG. 3 or (ii) physically unseparated from each other as indicated by a reference numeral 32 in FIG. 3 (e.g., the plurality of heating spaces can be contained in one (1) furnace body 36).

The weight loss ratio of a film by passing through the heating space indicates a ratio of a weight of the polymeric film and/or the raw material carbonaceous film which has been lost by the heating treatment, with respect to an original weight of the polymeric film and/or the raw material carbonaceous film each of which is a starting material. The weight loss ratio is calculated by using a formula below. Note that, in a case where the weight of the film is easily increased due to moisture absorption, it is preferable to calculate the weight loss ratio based on the weight of the film which has been dried with heat, etc. in advance of passing through the heating space.

Weight loss ratio (%)=(weight of film immediately before entering heating space−weight of film immediately after coming out of heating space)/ (weight of polymeric film and/or raw material carbonaceous film)×100

The weight of the film before the heating treatment is measured as follows: i.e., the film before the heating treatment is cut out and a weight of a cut-out piece is measured with the use of an electronic balance.

The weight of the film after the heating treatment is measured as follows: i.e., a size of the cut-out piece of the film before the heating treatment is marked with the use of a felt pen, then a part of the film thus marked is cut out after the heating treatment, and then a cut-out piece is measured with the use of an electronic balance.

Moisture of the films is removed under an appropriate condition, and then the weight of each of the films is measured. In a case where the film is made of polyimide, the film before the heating treatment and the film obtained by the heating treatment are maintained at a temperature of 200° C. for 24 hours and the weights of the films are measured within 5 minutes from when the films are taken out.

In order to avoid rapid change in temperature, it is possible to provide a moderate temperature gradient between the inlet and a central part of the heating space and between the central part and the outlet of the heating space. The temperature distribution in the heating space can be controlled by adjusting locations of the heater and a heat insulating material. Moreover, in order to reduce unevenness in shrinkage of the film, the temperature can vary in a film width direction.

According to the present invention, a length of one (1) heating space is 5 cm or greater, preferably 10 cm or greater, more preferably 20 cm or greater. Provided that the length is 5 cm or greater, it is possible to sufficiently apply thermal hysteresis to a passing film.

<Cooling Space>

The cooling space is a space for cooling down a film which has been heated up in the heating space. The cooling space is preferably set to have a temperature lower than a Tg of an employed polymeric film. The temperature of the cooling space indicates a lowest temperature of a film which passes through the cooling space. In a case where the cooling space is provided, the temperature of the cooling space is lower than that of an upstream heating space and 550° C. or lower, preferably 500° C. or lower, more preferably 450° C. or lower, further preferably 300° C. or lower, particularly preferably 100° C. or lower.

According to the present invention, the cooling space encompasses (i) a state after a film which has been heat-treated by the heating treatment device 21 (as illustrated in FIG. 2) is wound up once and before the film is heat-treated again by the heating treatment device (in this case, a temperature of the second heating treatment by the heating treatment device can be identical with or different from that of the first heating treatment), (ii) a space(s) between a plurality of heating treatment devices (the heating space 1 33, the heating space 2 34, the heating space 3 35) (see FIG. 3), and (iii) a space between heaters of the heating treatment device in which space a temperature of the film is decreased because the space between the heaters is large.

A carbonaceous film, which has been cooled down in the cooling space, is harder than a carbonaceous film which is being heated in the heating space. Moreover, thermal decomposition does not progress in the carbonaceous film which has been cooled down in the cooling space and is low in temperature. This makes it possible to carry out control for preventing breakage of the film, e.g., to adjust film tension and a film transporting speed with the use of a roll such as a dancer roll or a nip roll, or to carry out feedback control by monitoring a state of the film.

Moreover, a graphite film having a high thermal diffusivity can be easily obtained from a carbonaceous film which has been obtained by the continuous carbonization step in which the cooling space is provided. This may be because, by providing the cooling space, the carbonaceous film, whose molecular orientation is kept as in the cooling space, is subject to the following heating treatment in the heating space.

According to the present invention, a length of the cooling space is 5 cm or greater, preferably 10 cm or greater, more preferably 20 cm or greater. Provided that the length is 5 cm or greater, it is possible to cool down an entire film which passes through the cooling space.

<Temperature at Which Continuous Carbonization Step is Carried Out>

The continuous carbonization step is carried out at a temperature profile of 300° C. or higher and 1800° C. or lower, more preferably 550° C. or higher and 800° C. or lower, further preferably at a temperature profile which at least partially falls within a range of 550° C. or higher and 800° C. or lower. Provided that the heating treatment is carried out at a temperature of 300° C. or higher, a polymeric film starts to lose weight and accordingly a carbonaceous film can be obtained. It is preferable to carry out the continuous carbonization step at a temperature of 550° C. or higher because weight loss becomes greater. In a case where the continuous carbonization step is carried out at a temperature of 1800° C. or lower, sufficient film strength can be secured and accordingly the film hardly breaks. In particular, it is preferable to carry out the continuous carbonization step at a temperature of 800° C. or lower because, in a case where the continuous carbonization step is carried out at a temperature of 800° C. or lower, thermal decomposition progresses incompletely and therefore the film hardly breaks.

<Pressurization in Film Thickness Direction>

In general, in a case where heating treatment is carried out on a polymeric film, a carbonaceous film is obtained which has wrinkles and breakage that are caused by, for example, (i) elongation of the film due to moderated residual stress in the film by softening and due to stress in heating and (ii) uneven shrinkage due to thermal decomposition.

According to the present invention, the polymeric film and/or the raw material carbonaceous film is continuously heat-treated while being pressurized in the film thickness direction. This makes it possible to inhibit wrinkling of an obtained carbonaceous film. Hereinafter, the pressurization in the film thickness direction is also simply referred to as "pressurization". According to the present invention, a carbonaceous film is manufactured with the use of the continuous carbonization apparatus by applying, in the film thickness direction, pressure to the polymeric film and/or the raw material carbonaceous film, each of which is a raw material, while the polymeric film and/or the raw material carbonaceous film is being transported.

Even in a case where a carbonaceous film, which has been obtained by heat-treating a polymeric film, is further heat-treated, pressurization in the film thickness direction is effective for obtaining a carbonaceous film whose wrinkling is reduced.

The pressurization in the film thickness direction can be carried out by, for example, (i) mechanically applying stress to the film in a direction perpendicular to the film by utilizing a load of a weight or by the use of a presser or the like or (ii) blowing a fluid (such as gas) on the film. The pressurization by utilizing the load of the weight is particularly preferable in view of adjustment of a degree and a range of pressure and of simplicity of a device. Note that, in this specification, a mechanism for carrying out the pressurization is also referred to as "pressurization mechanism".

Figure 5:
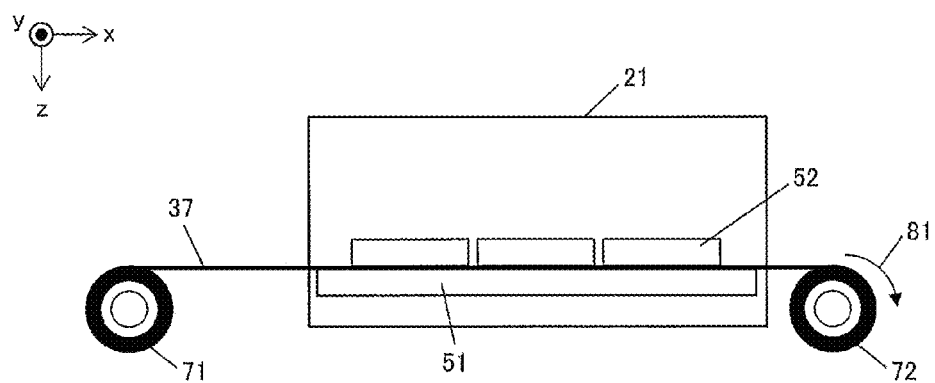
FIG. 5 illustrates an example of a method for applying pressure in a film thickness direction in a continuous carbonization step.

FIGS. 5 through 8 illustrate examples of a method for applying pressure in the film thickness direction in the continuous carbonization step. FIG. 5 illustrates an example of a pressurization method carried out by utilizing the load of the weight. In the pressurization method illustrated in FIG. 5, loads of weights 52 are applied to a film 37 on a hearth 51 in the heating treatment device 21. For example, the film 37 is wound off from a wind-off device 71 into the heating treatment device 21 and then wound up by a wind-up device 72 which is provided outside of the heating treatment device 21. An arrow 81 indicates a direction in which the film 37 is wound up. Each of the wind-off device 71 and the wind-up device 72 can be configured as a part of the film transporting device 22 (see FIG. 2) for transporting the film.

Figure 6:
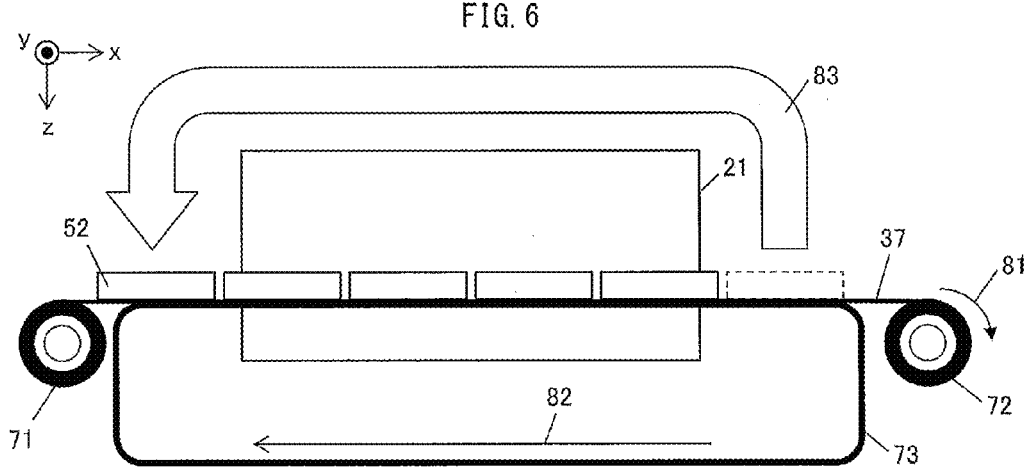
FIG. 6 illustrates an example of a method for applying pressure in a film thickness direction in a continuous carbonization step.

As illustrated in FIG. 6, the weights 52 can be transported together with the film 37 by a belt conveyor 73 and then collected in a direction indicated by an arrow 83 on an outlet side of the heating treatment device 21. That is, the weights 52 can be collected on the outlet side of the heating treatment device 21 such that the collected weights 52 are placed on an inlet side of the heating treatment device 21. According to the configuration, the weights 52 and the film 37 are transported together, and therefore friction between the film 37 and the weights 52 is reduced. This configuration is preferable because it is possible to inhibit breakage of the film 37. An arrow 82 indicates a direction in which the belt conveyor 73 rotates.

Figure 7:
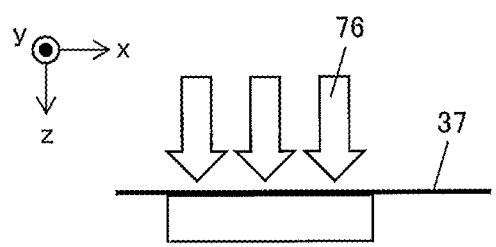
FIG. 7 illustrates an example of a method for applying pressure in a film thickness direction in a continuous carbonization step.

FIG. 7 illustrates a method of blowing a fluid 76 on the film 37. In FIG. 7, the fluid 76 is represented as arrows for the purpose of indicating a direction in which the fluid 76 is blown on the film 37. The pressurization method in which the fluid is used is preferable because it is possible to reduce friction on the surface of the film, thereby inhibiting breakage of the film.

Figure 8:
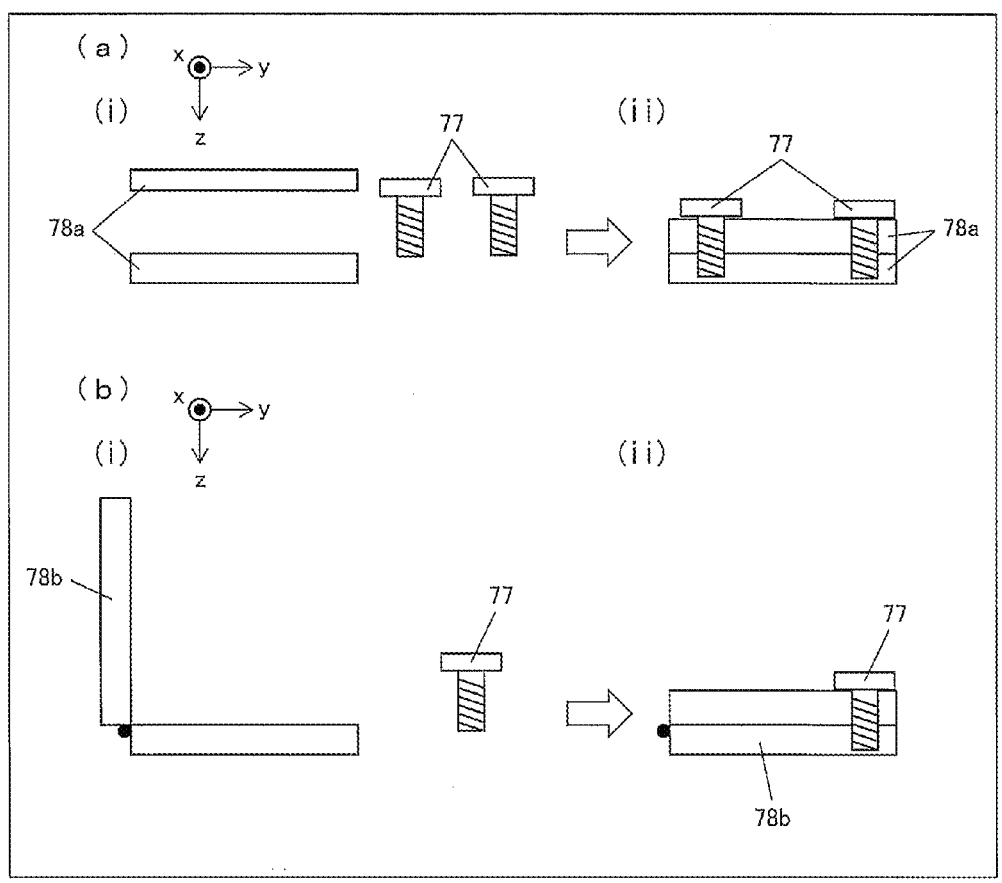
FIG. 8 illustrates an example of a method for applying pressure in a film thickness direction in a continuous carbonization step.

FIG. 8 illustrates a pressurization method in which plates 78a or 78b and a bolt(s) 77 are used. For example, a method can be employed in which, as illustrated in (a) of FIG. 8, a film (not illustrated) is provided between the plates 78a (see (i) in (a) of FIG. 8) and the film is pressurized by fixing the plates 78a with bolts 77 (see (ii) in (a) of FIG. 8). Alternatively, a film (not illustrated) is provided between the plates 78b which are connected to each other via a hinge (see (i) in (b) of FIG. 8) and the film is pressurized by fixing the plates 78b with a bolt 77 (see (ii) in (b) of FIG. 8).

In a case where the pressurization is carried out, the method of pressing the film from both sides of the film is effective. By adjusting surface quality (such as roughness and hardness) and a surface shape of the pressing member, it is possible to further inhibit wrinkling and breakage. It is particularly preferable that the surface of the pressing member is smooth so as not to apply resistance to the film which is being transported. A material of the pressing member is not limit to a particular one provided that the material is hardly deteriorated and deformed even at a high temperature. As the material of the pressing member, it is preferable to employ a material having high thermal conductivity. Examples of such a material encompass graphite, ceramics, metal, and a composite thereof. By using any of such materials, it is possible to evenly apply heat to the film in the heating treatment, and this allows further reduction of wrinkling. Graphite and ceramics each have a small thermal expansion coefficient, and therefore are hardly deformed in heating. From this, graphite and ceramics are suitable for bringing about the effects of the present invention. In a case where a mechanical pressurization mechanism is formed, the material is preferably easy to process. In such a case, graphite is preferable because graphite has extremely high processability. In a case where reaction may be caused with (i) oxygen entered via an opening of a device, (ii) pyrolysis gas of a film, and/or (iii) an impurity contained in a member, ceramics such as SiC or alumina is preferably used in view of excellent oxidation resistance. As a material having the advantageous properties of both graphite and ceramics, a material obtained by coating graphite with ceramics such as SiC is particularly preferable.

The pressurization in the film thickness direction is carried out in the heating space in which the film is deformed by thermal decomposition. The pressurization in the film thickness direction can be carried out in an entire temperature profile in the continuous carbonization step, particularly in at least part of a range of the temperature profile of 550° C. or higher and 800° C. or lower, preferably in the entire range of the temperature profile of 550° C. or higher and 800° C. or lower. Note that the temperature profile in which the pressurization is carried out preferably includes a temperature profile in which greater weight loss of the film occurs.

A lower limit pressure of the pressurization in the film thickness direction is 0.1 $g/cm^2$ or higher, preferably 0.5 $g/cm^2$ or higher, more preferably 1 $g/cm^2$ or higher, further preferably 2 $g/cm^2$ or higher, particularly preferably 5 $g/cm^2$ or higher. In a case where a flexible film is used, wrinkling can be reduced with low pressure of approximately 0.1 $g/cm^2$. However, as the pressure becomes higher, wrinkling can be inhibited further. Since the effect of inhibiting wrinkling becomes greater as the pressure in pressurization is increased, the pressure in pressurization has no upper limit. In a case where there is a risk of breakage of the film, it is preferable to carry out the pressurization with pressure of 20 $g/cm^2$ or lower.

<Tension by Friction>

According to the present invention, friction on the surface of the film can be caused by the pressurization in the film thickness direction. From this, tension caused by the friction (hereinafter, referred to as "tension by friction"), which is caused by the pressurization in the film thickness direction, can be applied to the film.

Figure 9:
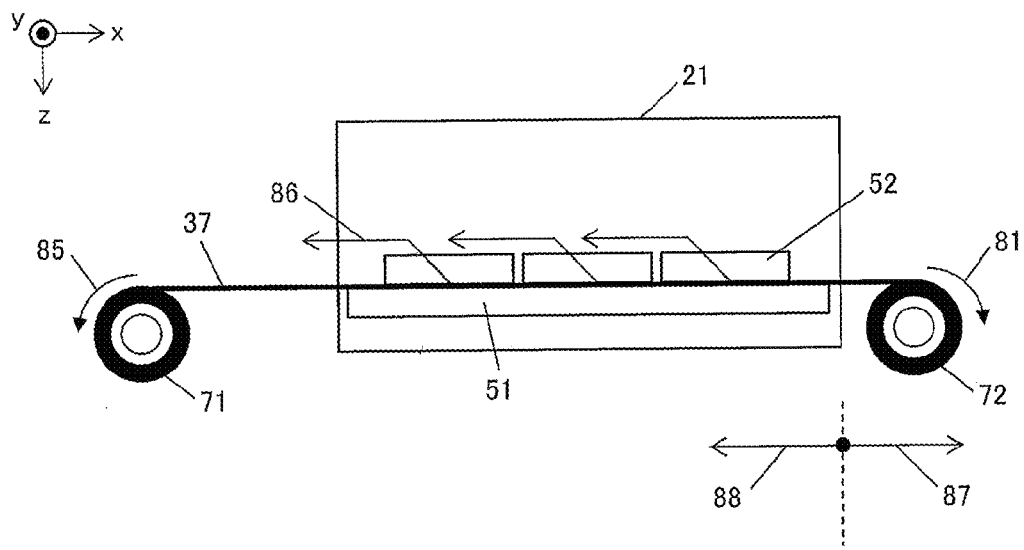
FIG. 9 is a schematic view for explaining force applied to a film.

FIG. 9 is a schematic view for explaining force applied to the film. In a case where, for example, the film is carried in the x-axis direction, force for transporting the film is applied to the film in the x-axis direction. In a case where, for example, the continuous carbonization apparatus includes the wind-off device 71 and the wind-up device 72 for transporting the film 37, force for transporting the film 37 is applied to the film 37 when the film 37 is wound up by the wind-up device 72 in the direction indicated by the arrow 81.

Moreover, another force is applied to the film in a direction opposite to that of the force for transporting the film so that the film is tensioned. As the another force, for example, pulling force for pulling the film 37 is applied to the film 37 in a direction indicated by an arrow 85 in a case where the film 37 is wound up by the wind-up device 72 in the direction indicated by the arrow 81. The pulling force corresponds to the tensile strength described in the above <Film transporting device>. That is, the tensile strength is applied to the film, and therefore a state is kept in which sag and wrinkling of the film is reduced.

Further, as above described, the tension by friction is applied to the film. In this specification, the tension by friction is the force in the direction opposite to that of the force for transporting the film and can be said as force caused by the friction due to the pressurization in the film thickness direction. For example, friction occurs between the film 37 and the weight 52 or the hearth 51. An arrow 86 schematically indicates the tension by friction. Note that, in a case where the configuration illustrated in FIG. 7 is employed as the pressurization mechanism, friction occurs between the film and the fluid.

In FIG. 9, an arrow 87 indicates force necessary to transport the film (i.e., the force for transporting the film), and an arrow 88 indicates a total of the tensile strength and the tension by friction. In a case where the force for transporting the film is larger than the total of the tensile strength and the tension by friction, the film can be transported in the x-axis direction.

Figure 10:
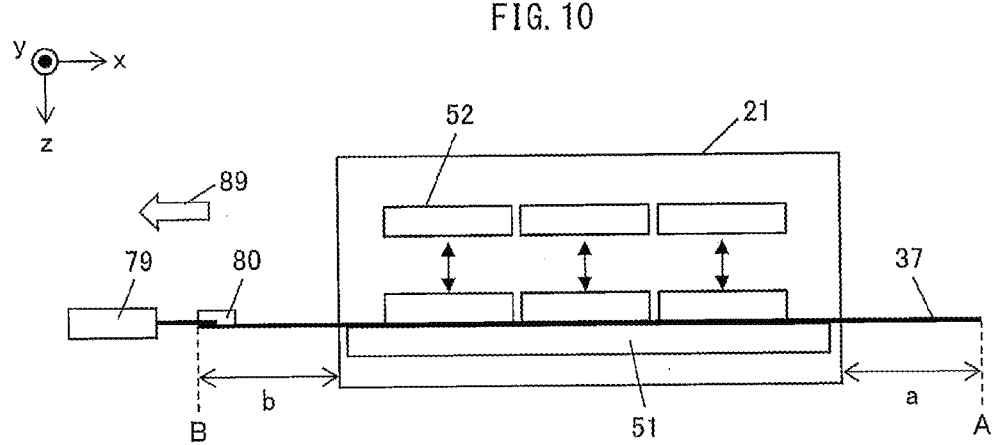
FIG. 10 is a schematic view illustrating a method for measuring tension by friction.

The following description will discuss procedures for measuring the tension by friction. FIG. 10 is a schematic view illustrating a method for measuring the tension by friction. In FIG. 10, an example measuring method is illustrated in which the pressurization is carried out with the use of the weight 52. Note, however, that the tension by friction can also be measured by the method described in the above <Pressurization in film thickness direction>.

First, a value of a force gage under pressurization in the film thickness direction is read (more specifically, under pressurization in the film thickness direction in a heating space in a temperature profile of 550° C. or higher and 800° C. or lower). The following description will discuss concrete measuring procedures. As the force gage, DS2-500N (manufactured by Imada Co., Ltd.)

While the pressurization and the heating treatment on the film 37 are carried out, transporting of the film 37 is stopped. Then, the film is cut perpendicularly to the length direction at a point B on the upstream side with respect to the heating treatment device 21 and at a point A on the downstream side with respect to the heating treatment device 21. The point B is distant from the inlet of the heating treatment device 21 by 20 cm, and the point A is distant from the outlet of the heating treatment device 21 by 20 cm. That is, each of a distance a and a distance b in FIG. 10 is 20 cm. In a case where a distance from the heating treatment device (i.e., each of (i) the distance between the heating treatment device and the wind-off device and (ii) the distance between the heating treatment device and the wind-up device) is shorter than 20 cm, the film is wound off by 20 cm and is then cut.

The film is cut at the point A and at the point B in this order between 2 seconds and 4 seconds from when the transporting of the film is stopped. The film can be cut by the use of, for example, a cutter. The film is cut such that each of two angles formed by the length direction of the film and a cross section of the film falls within a range of 80° or larger and 100° or smaller when viewed in the z-axis direction.

Then, a force gage 79 is fixed on the upstream side (i.e., a point B side) at a central part in the width direction of the film. The force gage 79 is fixed as follows so that the tension is evenly applied: that is, a connecting part (e.g., a hook) which is provided at an end of the force gage 79 is taped on the film 37 with an adhesive tape 80 which covers the connecting part and is stuck to the film 37 so as to extend across the entire width of the film 37. Here, the length of the adhesive tape 80 in the x-axis direction is 50 mm. The length of the adhesive tape 80 in the y-axis direction is set to equal to the film width. The connecting part (e.g., a hook) provided at the end of the force gage 79 is entirely covered with the adhesive tape 80. The force gage is fixed between 6 seconds and 10 seconds from when the transporting of the film is stopped. As the adhesive tape, P-cut tape No. 4140 (width: 50 mm, thickness: 0.155 mm, adhesion with respect to stainless steel: 14.22 N/25 mm, tensile strength: 97.7 N/25 mm; manufactured by Teraoka Seisakusho Co., Ltd.) can be employed.

Then, the force gage 79 is pulled along a film pass line in a direction (i.e., a direction indicated by an arrow 89), which is opposite to the direction in which the film is transported, and a value of the force gage when the film is transported at a line speed of 1.0 m/min is read.

The following explains a method for measuring the line speed. The line speed is measured with the use of a rotary encoder (E6C2-C type, manufactured by Omron Corporation). The following description will discuss a concrete measuring method.

The film is transported by manually pulling an end of the film which is drawn out of the heating treatment device. A free roll is provided between the heating treatment device and the wind-off device, and the free roll is rotatably supported by a support bar.

In this case, the film is moved on the free roll while making contact with the free roll. Since the free roll and the film are in contact with each other, friction is caused between the free roll and the film. Therefore, as the film moves, the free roll rotates accordingly.

A rubber roller, which is rotatably in contact with the free roll, is provided, and the rubber roller is connected with the encoder. Since the free roll and the rubber roller are in contact with each other, friction is caused between the free roll and the rubber roller. Therefore, as the free roll rotates, the rubber roller rotates accordingly.

That is, as the film moves, the free roll rotates and accordingly the rubber roller rotates, and rotation (specifically, a speed of rotation) of the rubber roller is detected by the encoder.

A distance by which the film has been moved can be calculated from the rotation of the rubber roller, a circumference of the rubber roller, and a circumference of the free roll. Then, the line speed can be calculated from (i) the distance by which the film has been moved and (ii) time taken for the film to be moved by the distance.

The force gage 79 is pulled between 13 seconds and 20 seconds from when the transporting of the film is stopped. In order to read a value on the force gage at a time point when the line speed is stabilized, the value on the force gage is read 17 seconds after the transporting of the film is stopped.

Next, a value of a force gage under no pressurization in the film thickness direction is read (more specifically, under no pressurization in the film thickness direction in the heating space in a temperature profile of 550° C. or higher and 800° C. or lower). The following description will discuss concrete measuring procedures.

Procedures before fixing the force gage are carried out while pressurization in the film thickness direction is being carried out, as with the measurement carried out while the pressurization is being carried out as described above. After the force gage is fixed, the pressurization in the film thickness direction by the pressurization mechanism is stopped, and then the force gage is pulled.

Note that the pressurization is stopped only in the heating space in the temperature profile of 550° C. or higher and 800° C. or lower. In other words, in a case where, for example, a heating space at 500° C. or at 850° C. is provided in the heating treatment device, the pressurization is carried out in the heating space at 500° C. or 850° C. in both the cases where the pressurization is carried out and is not carried out in the heating space in the temperature profile of 550° C. or higher and 800° C. or lower. Alternatively, the pressurization is not carried out in the heating space at 500° C. or 850° C. in both the cases where the pressurization is carried out and is not carried out in the heating space in the temperature profile of 550° C. or higher and 800° C. or lower. That is, in the measurement with the use of the force gage, the pressurization can be either carried out or not carried out at a temperature lower than 500° C. and at a temperature higher than 800° C., provided that whether doing the pressurization or undoing the pressurization is consistent. As such, the tension by friction only in the temperature profile of 550° C. or higher and 800° C. or lower can be calculated from the difference between the value measured under the pressurization and the value measured under no pressurization.

The "tension by friction" can be defined as a value obtained by dividing (i) the value obtained by subtracting the "value on the force gage read while the pressurization in the film thickness direction is not carried out" from the "value on the force gage read while the pressurization in the film thickness direction is carried out" by (ii) a cross-sectional area of the film which is the raw material.

Moreover, in calculating the tension by friction, the value read on the force gage under the pressurization in the film thickness direction and the value on the force gage under no pressurization in the film thickness direction are each measured tree times, and an average of the three values read under the pressurization and an average of the three values read under no pressurization are used. Note that a film to be measured is renewed for each of the measurements.

The cross-sectional area of the film is calculated as a product of a width and a thickness of the film. The thickness of the film is an average of thicknesses of the film, which are measured with a micrometer, at four points of the film which are arranged at even intervals in the width direction (i.e., which divide the film into equal five parts in the width direction). The width of the film is an average of lengths of upper and lower sides of the cross section of the film.

In view of inhibiting breakage of the film, the tension by friction is 0 kgf/cm$^2$ or higher and 420 kgf/cm$^2$ or lower, preferably 0.9 kgf/cm$^2$ or higher and 210 kgf/cm$^2$ or lower, more preferably 4.5 kgf/cm$^2$ or higher and 180 kgf/cm$^2$ or lower, further preferably 9 kgf/cm$^2$ or higher and 90 kgf/cm$^2$ or lower. In a case where the tension by friction is 420 kgf/cm$^2$ or lower, the film can be transported without breakage. The tension by friction is preferably as low as possible for inhibiting breakage of the film. Further, as the tension by friction is lower, a degree of freedom in adjusting tensile strength is increased, and this makes it possible to carry out the heating treatment under a condition in which wrinkling can be inhibited more.

As the pressure of the pressurization in the film thickness direction is higher, wrinkling can be inhibited more effectively but the tension by friction becomes higher. Under the circumstances, it is preferable to provide measures for lowering a coefficient of friction. Examples of a method for reducing the coefficient of friction encompass (i) a method of surface processing such as removing edges of a contact part of the pressurization mechanism with respect to the film, polishing a contact surface of the pressurization mechanism, carrying out chemical treatment on the contact surface, or coating the contact surface and (ii) a method of providing a third component as a sliding material, such as providing powder onto the contact surface or providing a smooth layer onto the contact surface. As the sliding material, a carbon material, ceramics, metal, or a composite thereof can be suitably employed because such materials are hardly deteriorated even at a high temperature.

In view of inhibiting breakage of the film, a total of the tensile strength and the tension by friction is 0.9 kgf/cm$^2$ or higher and 420 kgf/cm$^2$ or lower, preferably 4.5 kgf/cm$^2$ or higher and 220 kgf/cm$^2$ or lower, more preferably 18 kgf/cm$^2$ or higher and 120 kgf/cm$^2$ or lower, further preferably 30 kgf/cm$^2$ or higher and 75 kgf/cm$^2$ or lower. In a case where the total of the tensile strength and the tension by friction is 0.9 kgf/cm$^2$ or higher, it is possible to inhibit wrinkling by the tension. Further, meandering is reduced, and it is therefore possible to transport the film more stably. Meanwhile, in a case where the total of the tensile strength and the tension by friction is 420 kgf/cm$^2$ or lower, it is possible to transport the film while preventing breakage and elongation of the film caused by excessive tension.

<Batch Method in Manufacturing Graphite Film>

The method for manufacturing a graphite film from the carbonaceous film of the present invention is, for example, a method in which the carbonaceous film is graphitized or a method in which a graphitizing step is carried out after carbonization is carried out with a batch method (hereinafter, referred to as batch carbonization step). Further, a softening step can be carried out after the graphitizing step.

In the batch carbonization step, a polymeric film, which is a starting material, is carbonized by heating treatment under reduced pressure or in an atmosphere of inert gas. In the batch carbonization step, the heating treatment is generally carried out up to a temperature of approximately 1000° C. In a case where weight loss of the film continues even after the heating treatment in the continuous carbonization step, an additional batch carbonization step can be carried out so as to obtain a carbonaceous film in which thermal decomposition has further progressed. This method is effective for obtaining a graphite film that has a high thermal diffusivity by controlling disordered molecular orientation of the polymeric film.

In the graphitizing step, the carbonaceous film is heat-treated up to a higher temperature so as to obtain a graphitized film. The graphitizing step is carried out under reduced pressure or in the atmosphere of inert gas. The inert gas is most preferably argon, and it is further preferable to add a small amount of helium to argon. In particular, graphite is sublimated at a high temperature of 2200° C. or higher, and therefore heating treatment carried out under pressure by inert gas is suitable. Here, the "pressure by inert gas" indicates pressurization by excessively introducing gas for obtaining an atmosphere having pressure equal to or higher than the atmospheric pressure, unlike the pressurization in the film thickness direction in the continuous carbonization step and physical compression in the softening step. The temperature of the heating treatment in the graphitizing step is 2400° C. or higher, more preferably 2600° C. or higher, further preferably 2800° C. or higher, particularly preferably 2900° C. or higher. The graphitizing step can be carried out directly following the batch carbonization step. Alternatively, the graphitizing step can be carried out independently, after the batch carbonization step and a following cooling step.

In the softening step, plasticity is given to the film which has been obtained by the graphitizing step. The film obtained by the graphitizing step is in a foamed state in which a graphite layer is lifted up by internal gas such as (i) N$_2$ which does not constitute a graphite framework or (ii) a filler (phosphoric acid filler). In the case of the graphitized film in the foamed state, compression such as a compressing process or a rolling process is carried out in the film thickness direction after the graphitizing step so as to improve flex resistance.

The present invention can be configured as follows:

(1) That is, the present invention relates to the method for manufacturing a carbonaceous film with use of a continuous carbonization apparatus, the method including the step of: applying pressure to a polymeric film and/or a raw material carbonaceous film, of which the carbonaceous film is to be made, in a film thickness direction at a temperature profile at least partially falling within a range of 550° C. or higher and 800° C. or lower while the polymeric film and/or the raw material carbonaceous film is being transported.

(2) The present invention can relate to the method above described in (1) in which the pressure applied to the polymeric film and/or the raw material carbonaceous film in the film thickness direction is 0.1 g/cm$^2$ or higher.

(3) The present invention can relate to the method above described in (1) or (2) in which transporting force for transporting the polymeric film and/or the raw material carbonaceous film is applied to the polymeric film and/or the raw material carbonaceous film; tensile strength is applied to the polymeric film and/or the raw material carbonaceous film so that the polymeric film and/or the raw material carbonaceous film is tensioned, a direction in which the tensile strength is applied being opposite to a direction in which the transporting force is applied; tension by friction is applied to the polymeric film and/or the raw material carbonaceous film, the tension by friction being caused by friction due to pressurization on the polymeric film and/or the raw material carbonaceous film in the film thickness direction, and a direction in which the tension by friction is applied being opposite to the direction in which the transporting force is applied; and the transporting force is greater than a total of the tensile strength and the tension by friction.

(4) The present invention can relate to the method above described in (3) in which the tensile strength is 0 kgf/cm$^2$ or higher and 400 kgf/cm$^2$ or lower.

(5) The present invention can relate to the method above described in (3) or (4) in which the tension by friction is 0.9 kgf/cm$^2$ or higher and 420 kgf/cm$^2$ or lower.

(6) The present invention can relate to the method above described in any one of (3) through (5) in which the total of the tensile strength and the tension by friction is 0.9 kgf/cm$^2$ or higher and 420 kgf/cm$^2$ or lower.

(7) The present invention can relate to the method above described in any one of (1) through (6) in which the pressure is applied, by a load of a weight, to the polymeric film and/or the raw material carbonaceous film in the film thickness direction.

(8) The present invention can relate to the method for manufacturing a graphite film, the method including the step of: heat-treating a carbonaceous film at a temperature of 2400° C. or higher, the carbonaceous film having been prepared by the method described in any one of the above (1) through (7).

Moreover, the present invention can also configured as follows:

<1> The present invention can relate to the method for manufacturing a carbonaceous film with use of a continuous carbonization apparatus, the method including the step of: applying pressure, in the continuous carbonization apparatus, to a polymeric film and/or a carbonaceous film in a film thickness direction at a temperature profile at least partially falling within a range of 550° C. or higher and 800° C. or lower.

<2> The present invention can relate to the method above described in <1> in which the pressure applied to the polymeric film and/or the carbonaceous film in the film thickness direction is 0.1 g/cm$^2$ or higher.

<3> The present invention can relate to the method above described in <1> or <2> in which the pressure is applied, by a load of a weight, to the polymeric film and/or the carbonaceous film in the film thickness direction.

<4> The present invention can relate to the method for manufacturing a graphite film, the method including the step of: heat-treating a carbonaceous film at a temperature of 2400° C. or higher, the carbonaceous film having been prepared by the method described in any one of the above <1> through <3>.

EXAMPLES

The following description will discuss Examples of the invention. Note, however, that the present invention is not limited to the Examples.

<Method for Preparing Polymeric Film>
[Preparation of Film From Resin A]

In a dimethylformamide (hereinafter, referred to as DMF) solution obtained by dissolving a diamine consisting of 75 mol % of 4,4'-diaminodiphenyl ether (hereinafter, referred to as ODA) and 25 mol % of p-phenylenediamine (hereinafter, referred to as PDA), an acid dianhydride consisting of 100 mol % of pyromellitic dianhydride (hereinafter, referred to as PMDA) was dissolved so as to have an amount equimolar to the diamine. As a result, a solution containing 18.5 wt % of polyamic acid was obtained. While cooling the solution, acetic anhydride (having 1 equivalent weight with respect to a carboxylic acid group contained in the polyamic acid), isoquinoline (having 1 equivalent weight with respect to the carboxylic acid group), and an imidized catalyst containing DMF were added to the solution for defoaming. A mixed solution thus obtained was then applied to an aluminum foil so as to have a predetermined thickness after being dried. A layer of the mixed solution on the aluminum foil was dried with the use of a hot-air oven and a far-infrared heater.

The following describes a drying condition in a case where an obtained thickness is 75 μm. The layer of the mixed solution on the aluminum foil was dried at 120° C. for 240 seconds with the use of the hot-air oven, and consequently a gel film having a self-supporting property was obtained. The gel film was peeled off from the aluminum foil and then fixed to a frame. Further, the gel film was dried by gradually heating up as follows: that is, at 120° C. for 30 seconds, at 275° C. for 40 seconds, at 400° C. for 43 seconds, at 450° C. for 50 seconds with the use of the hot-air oven, and then at 460° C. for 23 seconds with the use of the far-infrared heater. Films having the other thicknesses were obtained by adjusting burning time in proportion to the thickness. For example, in a case where a film having a thickness of 50 μm was obtained, the burning time was a half of that of the film having the thickness of 75 μm.

As above described, each film (having birefringence of 0.14) was prepared from resin A.

[Preparation of Film From Resin C]

Each film (having birefringence of 0.10) was prepared from resin C in a manner similar to that of the resin A, except that polyamic acid was prepared by dissolving, in a DMF solution in which diamine consisting of 100 mol % of ODA was dissolved, dianhydride which consists of 100 mol % of PMDA and is equimolar to diamine.

<Adjustment of Weight>

The pressurization in the film thickness direction was carried out with the use of weights. Each of the weights was made of PSG graphite and had a length of 450 mm and a width of 290 mm. Depending on conditions, a thickness of the weight was changed. For example, in a case where pressure of the pressurization in the film thickness direction was 2 g/cm$^2$, a weight (1.8 kg) having a thickness of 8 mm was used. The weight was used in the heating space such that (i) the weight covered the entire film in the heating space so that a center of gravity of the weight is located at a central part of the film in a TD direction of the film and (ii) the weight was placed so that an MD direction of the film conforms to a length direction of the weight and the TD direction of the film conforms to a width direction of the weight.

<Method for Measuring Weights used to Calculate Weight Loss Ratio>

A weight of the film before being subjected to the heating treatment is measured as follows: i.e., the film before the heating treatment is cut out and a weight of a cut-out piece is measured with the use of an electronic balance.

A weight of the film after being subjected to the heating treatment is measured as follows: i.e., a size of the cut-out piece, whose weight has been measured before the heating treatment, is marked on the film with the use of a felt pen, then a part of the film thus marked is cut out after the heating treatment, and then a cut-out piece is measured with the use of an electronic balance.

Moisture of the films is removed under an appropriate condition, and then the weight of each of the films is measured. In a case where the film is made of polyimide, the film before the heating treatment and the film obtained by the heating treatment are kept at a temperature of 200° C. for 24 hours and the weights of the films are measured within 5 minutes from when the films are taken out.

<Measurement of Birefringence>

The birefringence of the polymeric film was measured with the use of a system for measuring a refractive index and a film thickness (manufactured by Metricon Corporation; model number: 2010 Prism Coupler). The measurement was carried out as follows: that is, a refractive index in each of a TE mode and a TM mode was measured in an atmosphere of 23° C. with the use of a light source having a wavelength of 594 nm, and then a difference (TE−TM) between the TE mode and the TM mode was calculated.

<Measurement of Temperatures in Heating Space and Cooling Space>

Regarding the temperatures of the heating space and the cooling space, actual temperatures of the film which passes through the heating space and the cooling space were measured. The actual temperatures of the film passing through the heating space and the cooling space were measured with the use of a φ0.5 mm sheathed type K thermocouple (manufactured by Yamari Industries, Limited) by causing the film to make contact with the thermocouple. The temperature of the heating space was measured by measuring the temperature of the passing film at a location nearest to the heater.

A temperature of a cooling space is measured as follows: first, a plurality of medians of temperatures in the TD direction of the film are measured between adjacent two heating spaces. Next, a location is specified whose temperature is the lowest among the above plurality of medians in a range in the MD direction of the film. In a case where the temperature at the specified location falls within the temperature range that satisfies the definition of the cooling space in the present invention, the temperature of the specified location is regarded as the temperature of the cooling space.

<Measurement of Tensile Strength>

A tension pick-up device was provided between the wind-off device and the heating treatment device, tension was adjusted by feedback control, and a value of the tension was measured.

<Measurement of Tension by Friction>

The tension by friction was measured by the method described in the above <Tension by friction>.

<Evaluation of Wrinkles After Continuous Carbonization Step (Winding Up Test)>

Wrinkles on the carbonaceous film obtained by the continuous carbonization step were evaluated. A polymeric film roll having a length of 300 m was heat-treated by the continuous carbonization step. A carbonaceous film thus obtained was cut out at three locations of 50 m, 150 m, and 250 m from an end of the carbonaceous film. Each of the cut-out pieces was wound fivefold around a cardboard tube in an atmosphere of 23° C. so as to confirm whether or not the cut-out piece is broken. A cut-out piece having more wrinkles is more easily broken when being wound around the cardboard tube, and therefore cannot be wound around a cardboard tube having a small diameter.

A cut-out piece which was not broken even when being wound around a cardboard tube having a diameter of 2 inches was evaluated to be "A". A cut-out piece which was broken when being wound around a cardboard tube having a diameter of 2 inches but was not broken when being wound around a cardboard tube having a diameter of 3 inches was evaluated to be "B". A cut-out piece which was broken when being wound around a cardboard tube having a diameter of 3 inches but was not broken when being wound around a cardboard tube having a diameter of 4 inches was evaluated to be "C". A cut-out piece which was broken when being wound around a cardboard tube having a diameter of 4 inches but was not broken when being wound around a cardboard tube having a diameter of 6 inches was evaluated to be "D". A cut-out piece which was broken even when being wound around a cardboard tube having a diameter of 6 inches was evaluated to be "E".

<Evaluation of Breakage>

Stability of the continuous carbonization step was evaluated based on a frequency of breakage of the carbonaceous film. A polymeric film having a length of 300 m was heat-treated in the continuous carbonization step. A carbonaceous film having less than 1 breakage per 100 m was evaluated to be "A", a carbonaceous film having 1 or more and less than 2 breakages per 100 m was evaluated to be "B", a carbonaceous film having 2 or more and less than 3 breakages per 100 m was evaluated to be "C", and a carbonaceous film having 3 or more breakages per 100 m was evaluated to be "D".

<Measurement of Thermal Diffusivity of Graphite Film>

A thermal diffusivity in a surface direction of a graphite film was measured as follows: that is, a sample having a shape of 4 mm×40 mm was cut out from the graphite film and a cut out piece thus obtained was measured in an atmosphere of 23° C. and at 10 Hz with the use of a thermal diffusivity measuring device ("LaserPit" manufactured by Ulvac-Riko, Inc.) which utilizes an AC method.

<Evaluation of Flatness of Graphite Film>

On a graphite film having low flatness, a scar is caused in the softening step. In particular, in a case where a film which has wrinkles, sag, and/or ripples is extended by applying pressure, a linear scar is caused. From this, the flatness of the graphite film was evaluated based on occurrence frequency of scars.

A film having less than 1 linear scar, which has a length of 5 mm or longer, per 1 m$^2$ was evaluated to be "A", a film having 1 or more and less than 2 linear scars under the same condition was evaluated to be "B", a film having 2 or more and less than 3 linear scars under the same condition was evaluated to be "C", a film having 3 or more and less than 5 linear scars under the same condition was evaluated to be "D", and a film having 5 or more linear scars under the same condition was evaluated to be "E".

Example 1

A film roll of a resin A having a birefringence of 0.14, a thickness of 75 µm, a width of 200 mm, and a length of 300 m was set to the wind-off device and was then subjected to the continuous carbonization step while being continuously moved to the heating treatment device.

Each of heating spaces had a length of 50 cm in the MD direction and a length of 300 mm in the TD direction. Air in each of the heating space was replaced with nitrogen so as to have a nitrogen atmosphere flow (2 L/min), and the heating spaces were set to have temperatures of 550° C., 600° C., 650° C., 700° C., 750° C., and 800° C., respectively.

Figure 11:
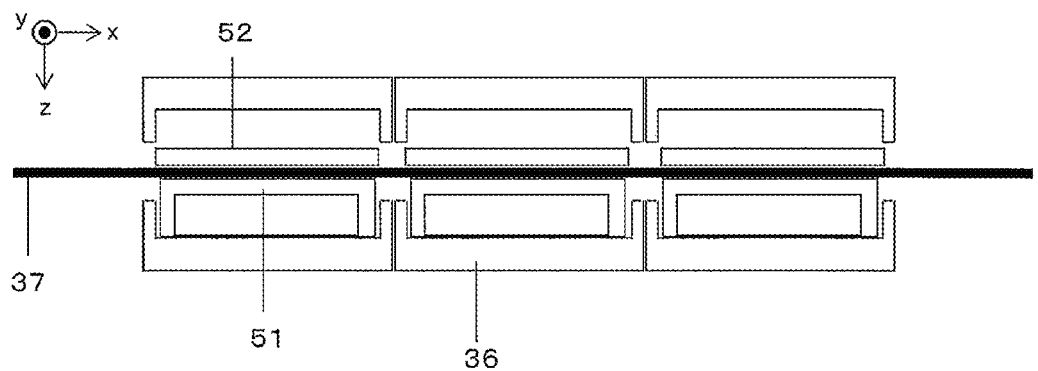
FIG. 11 illustrates an example of a method for applying pressure in a film thickness direction in a continuous carbonization step.

The temperature of each of the heating spaces was adjusted such that (i) a set temperature is obtained at a location at which a heater, which is provided at a part 25 cm distant from an inlet of the heating space, is nearest to the film and (ii) the temperature in the heating space becomes uniform. In particular, the temperature of each of the heating spaces was adjusted such that the temperature in the width direction of the film at the part 25 cm distant from the inlet of the heating space was constant within ±1° C. The heaters were spaced from each other in the MD direction at intervals of 50 cm so as to secure a cooling space, and a temperature was measured at a point which (i) was an intermediate point between locations of respective adjacent heating spaces at which locations the temperature was measured and (ii) was a center of the film. A line speed was adjusted to 50 cm/min. The film was transported while tensile strength of 30 kgf/cm² was being applied to the film. In each of the heating spaces, the film is slid and transported while being sandwiched by a graphite (PSG) pedestal (i.e., the hearth 51) and a weight 52 in a furnace body 36 (see FIG. 11). The pedestal and the weight were provided so as to cover a range wider than a range in which the film passes through in the heating space. Pressure of the pressurization in the film thickness direction was set to 2 g/cm² by adjusting a thickness of the graphite weight so as to cause the graphite weight to have a size of 450 mm×290 mm×8 mm. Breakage of the film in the continuous carbonization step was evaluated.

Figure 12:
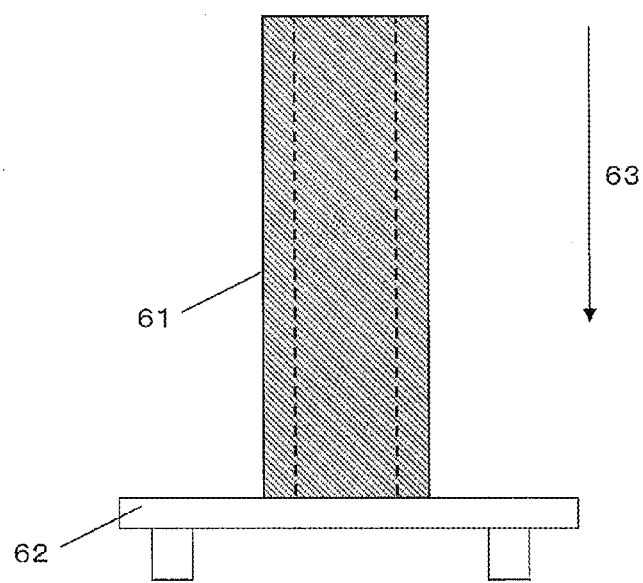
FIG. 12 illustrates a method for setting a film in a graphitizing step of each of Examples and Comparative Examples.

Next, the carbonaceous film obtained by the continuous carbonization step was cooled down to a room temperature (i.e., 23° C.), then wrinkles were evaluated, then the carbonaceous film was rolled into a scroll 61 having an inner diameter of 100 mm, then the scroll 61 was set to a hearth 62 so that the width direction of the film conforms to a vertical direction as illustrated in FIG. 12, and then a graphitizing step was carried out up to 2900° C. at a rate of temperature increase of 2° C./min. Note that an arrow 63 in FIG. 12 indicates a gravitational direction.

Then, the film obtained by the graphitizing step was cooled down to the room temperature (i.e., 23° C.), and the softening step was carried out on the graphitized film at the room temperature (i.e., 23° C.) under pressure of 10 MPa. Thus, a graphite film was obtained. The graphite film thus obtained was cut out at three locations, and each of cut-out pieces thus obtained was evaluated in terms of thermal diffusivity and flatness. Results are shown in Table 1. Note that a weight loss ratio of the carbonaceous film after the continuous carbonization step and before the graphitizing step was 38%.

Example 2

The various evaluations were carried out on a graphite film which had been prepared in a manner similar to that of Example 1 except that the pressure of the pressurization in the film thickness direction was adjusted to 0.1 g/cm². Results are shown in Table 1. Note that a weight loss ratio of the carbonaceous film after the continuous carbonization step and before the graphitizing step was 38%.

Example 3

The various evaluations were carried out on a graphite film which had been prepared in a manner similar to that of Example 1 except that the pressure of the pressurization in the film thickness direction was adjusted to 0.5 g/cm². Results are shown in Table 1. Note that a weight loss ratio of the carbonaceous film after the continuous carbonization step and before the graphitizing step was 38%.

Example 4

The various evaluations were carried out on a graphite film which had been prepared in a manner similar to that of Example 1 except that the pressure of the pressurization in the film thickness direction was adjusted to 1 g/cm². Results are shown in Table 1. Note that a weight loss ratio of the carbonaceous film after the continuous carbonization step and before the graphitizing step was 38%.

Example 5

The various evaluations were carried out on a graphite film which had been prepared in a manner similar to that of Example 1 except that the pressure of the pressurization in the film thickness direction was adjusted to 5 g/cm². Results are shown in Table 1. Note that a weight loss ratio of the carbonaceous film after the continuous carbonization step and before the graphitizing step was 38%.

Example 6

The various evaluations were carried out on a graphite film which had been prepared in a manner similar to that of Example 1 except that the pressure of the pressurization in the film thickness direction was adjusted to 10 g/cm². Results are shown in Table 1. Note that a weight loss ratio of the carbonaceous film after the continuous carbonization step and before the graphitizing step was 38%.

Example 7

The various evaluations were carried out on a graphite film which had been prepared in a manner similar to that of Example 1 except that the pressure of the pressurization in the film thickness direction was adjusted to 20 g/cm². Results are shown in Table 1. Note that a weight loss ratio of the carbonaceous film after the continuous carbonization step and before the graphitizing step was 38%.

Example 8

The various evaluations were carried out on a graphite film which had been prepared in a manner similar to that of Example 1 except that the tensile strength was adjusted to 1 kgf/cm². Results are shown in Table 1. Note that a weight loss ratio of the carbonaceous film after the continuous carbonization step and before the graphitizing step was 38%.

Example 9

The various evaluations were carried out on a graphite film which had been prepared in a manner similar to that of Example 1 except that the tensile strength was adjusted to 5 kgf/cm². Results are shown in Table 1. Note that a weight loss ratio of the carbonaceous film after the continuous carbonization step and before the graphitizing step was 38%.

Example 10

The various evaluations were carried out on a graphite film which had been prepared in a manner similar to that of Example 1 except that the tensile strength was adjusted to 70 kgf/cm². Results are shown in Table 1. Note that a weight loss ratio of the carbonaceous film after the continuous carbonization step and before the graphitizing step was 38%.

Example 11

The various evaluations were carried out on a graphite film which had been prepared in a manner similar to that of Example 1 except that the tensile strength was adjusted to 200 kgf/cm$^2$. Results are shown in Table 1. Note that a weight loss ratio of the carbonaceous film after the continuous carbonization step and before the graphitizing step was 38%.

Example 12

The various evaluations were carried out on a graphite film which had been prepared in a manner similar to that of Example 1 except that the tensile strength was adjusted to 400 kgf/cm$^2$. Results are shown in Table 1. Note that a weight loss ratio of the carbonaceous film after the continuous carbonization step and before the graphitizing step was 38%.

Example 13

The various evaluations were carried out on a graphite film which had been prepared in a manner similar to that of Example 10 except that the pressure of the pressurization in the film thickness direction was adjusted to 0.5 g/cm$^2$. Results are shown in Table 2. Note that a weight loss ratio of the carbonaceous film after the continuous carbonization step and before the graphitizing step was 38%.

Example 14

The various evaluations were carried out on a graphite film which had been prepared in a manner similar to that of Example 1 except that, as a raw material, a film (polyimide film manufactured by DuPont; Kapton H) was used which was made of resin B and had a birefringence of 0.10, a thickness of 75 µm, a width of 200 mm, and a length of 300 m. Results are shown in Table 2. Note that a weight loss ratio of the carbonaceous film after the continuous carbonization step and before the graphitizing step was 38%.

Example 15

The various evaluations were carried out on a graphite film which had been prepared in a manner similar to that of Example 1 except that, as a raw material, a film was used which was made of resin C and had a birefringence of 0.10, a thickness of 75 µm, a width of 200 mm, and a length of 300 m. Results are shown in Table 2. Note that a weight loss ratio of the carbonaceous film after the continuous carbonization step and before the graphitizing step was 38%.

Example 16

The various evaluations were carried out on a graphite film which had been prepared in a manner similar to that of Example 1 except that, as a raw material, a film was used which was made of resin A and had a birefringence of 0.14, a thickness of 50 µm, a width of 200 mm, and a length of 300 m. Results are shown in Table 2. Note that a weight loss ratio of the carbonaceous film after the continuous carbonization step and before the graphitizing step was 38%.

Example 17

The various evaluations were carried out on a graphite film which had been prepared in a manner similar to that of Example 1 except that, as a raw material, a film was used which was made of resin A and had a birefringence of 0.14, a thickness of 75 µm, a width of 100 mm, and a length of 300 m. Results are shown in Table 2. Note that a weight loss ratio of the carbonaceous film after the continuous carbonization step and before the graphitizing step was 38%.

Example 18

The various evaluations were carried out on a graphite film which had been prepared in a manner similar to that of Example 1 except that, as a raw material, a film was used which was made of resin A and had a birefringence of 0.14, a thickness of 75 µm, a width of 250 mm, and a length of 300 m. Results are shown in Table 2. Note that a weight loss ratio of the carbonaceous film after the continuous carbonization step and before the graphitizing step was 38%.

Example 19

The various evaluations were carried out on a graphite film which had been prepared in a manner similar to that of Example 1 except that the temperatures of the heating spaces were set to 550° C., 600° C., 650° C., and 700° C., respectively. Results are shown in Table 2. Note that a weight loss ratio of the carbonaceous film after the continuous carbonization step and before the graphitizing step was 31%.

Example 20

The various evaluations were carried out on a graphite film which had been prepared in a manner similar to that of Example 19 except that no cooling space was provided between the heating spaces. Results are shown in Table 2. Note that a weight loss ratio of the carbonaceous film after the continuous carbonization step and before the graphitizing step was 31%.

Example 21

The various evaluations were carried out on a graphite film which had been prepared in a manner similar to that of Example 1 except that the temperatures of the heating spaces were set to 800° C. Results are shown in Table 2. Note that a weight loss ratio of the carbonaceous film after the continuous carbonization step and before the graphitizing step was 38%.

Example 22

The various evaluations were carried out on a graphite film which had been prepared in a manner similar to that of Example 21 except that, as a raw material, a film was used which was made of resin B, had a birefringence of 0.10, a thickness of 75 µm, a width of 200 mm, and a length of 300 m. Results are shown in Table 2. Note that a weight loss ratio of the carbonaceous film after the continuous carbonization step and before the graphitizing step was 38%.

Example 23

The various evaluations were carried out on a graphite film which had been prepared in a manner similar to that of Example 21 except that, as a raw material, a film was used which was made of resin C, had a birefringence of 0.10, a thickness of 75 μm, a width of 200 mm, and a length of 300 m. Results are shown in Table 2. Note that a weight loss ratio of the carbonaceous film after the continuous carbonization step and before the graphitizing step was 38%.

Example 24

The breakage of a film was evaluated which had been prepared by carrying out a continuous carbonization step in a manner similar to that of Example 22 except that the temperatures of the heating spaces were set to 600° C. Moreover, the film, which had been obtained by the continuous carbonization step, was cooled down to the room temperature (i.e., 23°) and then wrinkles of the film were evaluated.

Next, the film thus obtained was additionally subjected to a batch carbonization step. In the batch carbonization step, the film was cut into square-shaped pieces, the square-shaped pieces and natural graphite sheets having a thickness of 200 μm were stacked alternately, and a graphite weight was placed on a laminate thus obtained so that a load of 5 g/cm² was uniformly applied to the laminate. The laminate was heat-treated up to 1400° C. at a rate of temperature increase of 2° C./min.

Then, the laminate of carbonaceous films and graphite sheets, which had been obtained by the batch carbonization step, was subjected to a graphitizing step up to 2900° C. at a rate of temperature increase of 2° C./min. The film obtained by the graphitizing step was compressed with a pressure of 10 MPa, and a graphite film thus obtained was cut out at three locations. Each of cut-out pieces thus obtained was evaluated in terms of thermal diffusivity. Results are shown in Table 2. Note that a weight loss ratio of the carbonaceous film after the continuous carbonization step and before the batch carbonization step was 11%.

Example 25

The various evaluations were carried out on a graphite film which had been prepared in a manner similar to that of Example 24 except that, as a raw material, a film was used which was made of resin C and had a birefringence of 0.10, a thickness of 75 μm, a width of 200 mm, and a length of 300 m. Results are shown in Table 3. Note that a weight loss ratio of the carbonaceous film after the continuous carbonization step and before the batch carbonization step was 11%.

Example 26

The various evaluations were carried out on a graphite film which had been prepared in a manner similar to that of Example 1 except that no pressure was applied in the film thickness direction in the heating space having a set temperature of 800° C. Results are shown in Table 3. Note that a weight loss ratio of the carbonaceous film after the continuous carbonization step and before the graphitizing step was 38%.

Example 27

The various evaluations were carried out on graphite film which had been prepared in a manner similar to that of Example 1 except that no pressure was applied in the film thickness direction in the heating spaces having respective set temperatures of 750° C. and 800° C. Results are shown in Table 3. Note that a weight loss ratio of the carbonaceous film after the continuous carbonization step and before the graphitizing step was 38%.

Example 28

The various evaluations were carried out on a graphite film which had been prepared in a manner similar to that of Example 1 except that no pressure was applied in the film thickness direction in the heating spaces having respective set temperatures of 550° C., 600° C., 650° C., 750° C., and 800° C. Results are shown in Table 3. Note that a weight loss ratio of the carbonaceous film after the continuous carbonization step and before the graphitizing step was 38%.

Example 29

The various evaluations were carried out on a graphite film which had been prepared in a manner similar to that of Example 1 except that no pressure was applied in the film thickness direction in the heating spaces having respective set temperatures of 550° C., 600° C., 700° C., 750° C., and 800° C. Results are shown in Table 3. Note that a weight loss ratio of the carbonaceous film after the continuous carbonization step and before the graphitizing step was 38%.

Example 30

The various evaluations were carried out on a graphite film which had been prepared in a manner similar to that of Example 1 except that the tensile strength was adjusted to 0 kgf/cm² and the pressure of the pressurization in the film thickness direction was adjusted to 45 g/cm². Results are shown in Table 3. Note that a weight loss ratio of the carbonaceous film after the continuous carbonization step and before the graphitizing step was 38%.

Example 31

The various evaluations were carried out on a graphite film which had been prepared in a manner similar to that of Example 30 except that the pressure of the pressurization in the film thickness direction was adjusted to 23 g/cm². Results are shown in Table 3. Note that a weight loss ratio of the carbonaceous film after the continuous carbonization step and before the graphitizing step was 38%.

Example 32

The various evaluations were carried out on a graphite film which had been prepared in a manner similar to that of Example 30 except that the pressure of the pressurization in the film thickness direction was adjusted to 0.1 g/cm². Results are shown in Table 3. Note that a weight loss ratio of the carbonaceous film after the continuous carbonization step and before the graphitizing step was 38%.

Example 33

The various evaluations were carried out on a graphite film which had been prepared in a manner similar to that of Example 30 except that the pressure of the pressurization in the film thickness direction was adjusted to 0.5 g/cm². Results are shown in Table 3. Note that a weight loss ratio of the carbonaceous film after the continuous carbonization step and before the graphitizing step was 38%.

Example 34

The various evaluations were carried out on a graphite film which had been prepared in a manner similar to that of Example 2 except that the tensile strength was adjusted to 4 kgf/cm². Results are shown in Table 3. Note that a weight loss ratio of the carbonaceous film after the continuous carbonization step and before the graphitizing step was 38%.

Comparative Example 1

Example 1 of Japanese Patent Application Publication Tokukaihei No. 4-149013 (1992) was carried out.

The various evaluations were carried out on a graphite film which had been prepared in a manner similar to that of Example 1 except that, as a raw material, a film was used which was made of resin B and had a birefringence of 0.10, a thickness of 50 μm, a width of 50 mm, and a length of 300 m, the set temperatures of the heating spaces were adjusted to 1000° C., a tensile strength of 2 kgf/cm² was applied to the film, the line speed was set to 1.25 cm/min in order to increase the temperature up to 1000° C. at a rate of temperature increase of 25° C./min, no hearth was provided in the heating spaces, and no load was applied to the film. Results are shown in Table 4. Note that a weight loss ratio of the carbonaceous film after the continuous carbonization step and before the graphitizing step was 50%.

Comparative Example 2

Example 2 of Japanese Patent Application Publication Tokukai No. 2004-299937 was carried out.

The various evaluations were carried out on a graphite film which had been prepared in a manner similar to that of Example 1 except that, as a raw material, a film was used which was made of resin C and had a birefringence of 0.10, a thickness of 50 μm, a width of 50 mm, and a length of 300 m, the temperature was adjusted to 800° C., a tensile strength of 0.1 kgf/cm² or lower was applied to the film, the film was transported at a line speed of 1.66 cm/min, and no load was applied to the film in the heating spaces. Results are shown in Table 4. Note that a weight loss ratio of the carbonaceous film after the continuous carbonization step and before the graphitizing step was 38%.

Comparative Example 3

The various evaluations were carried out on a graphite film which had been prepared in a manner similar to that of Example 1 except that no load was applied. Results are shown in Table 4. Note that a weight loss ratio of the carbonaceous film after the continuous carbonization step and before the graphitizing step was 38%.

Comparative Example 4

The various evaluations were carried out on a graphite film which had been prepared in a manner similar to that of Example 21 except that no load was applied. Results are shown in Table 4. Note that a weight loss ratio of the carbonaceous film after the continuous carbonization step and before the graphitizing step was 38%.

Comparative Example 5

The various evaluations were carried out on a graphite film which had been prepared in a manner similar to that of Comparative Example 3 except that the heating space having the set temperature of 800° C. was replaced with a heating space having a set temperature of 850° C., and pressure in the film thickness direction was applied in the heating space having the set temperature of 850° C. Results are shown in Table 4. Note that a weight loss ratio of the carbonaceous film after the continuous carbonization step and before the graphitizing step was 38%.

Comparative Example 6

The various evaluations were carried out on a graphite film which had been prepared in a manner similar to that of Comparative Example 3 except that the heating space having the set temperature of 550° C. was replaced with a heating space having a set temperature 500° C., and pressure in the film thickness direction was applied in the heating space having the set temperature of 500° C. Results are shown in Table 4. Note that a weight loss ratio of the carbonaceous film after the continuous carbonization step and before the graphitizing step was 38%.

Example 35

The various evaluations were carried out on a graphite film which had been prepared in a manner similar to that of Example 19 except that the pressure of the pressurization in the film thickness direction was adjusted to 3 g/cm². Results are shown in Table 5. Note that a weight loss ratio of the carbonaceous film after the continuous carbonization step and before the graphitizing step was 31%.

Example 36

The various evaluations were carried out on a graphite film which had been prepared in a manner similar to that of Example 20 except that the pressure of the pressurization in the film thickness direction was adjusted to 3 g/cm². Results are shown in Table 5. Note that a weight loss ratio of the carbonaceous film after the continuous carbonization step and before the graphitizing step was 31%.

Example 37

The various evaluations were carried out on a graphite film which had been prepared in a manner similar to that of Example 36 except that a cooling space was provided between the heating space at 650° C. and the heating space at 700° C. Results are shown in Table 5. Note that a weight loss ratio of the carbonaceous film after the continuous carbonization step and before the graphitizing step was 31%.

Example 38

The various evaluations were carried out on a graphite film which had been prepared in a manner similar to that of Example 36 except that a cooling space was provided between the heating space at 550° C. and the heating space at 600° C. Results are shown in Table 5. Note that a weight loss ratio of the carbonaceous film after the continuous carbonization step and before the graphitizing step was 31%.

Example 39

The various evaluations were carried out on a graphite film which had been prepared in a manner similar to that of Example 36 except that a cooling space was provided between the heating space at 600° C. and the heating space at 650° C. Results are shown in Table 5. Note that a weight loss ratio of the carbonaceous film after the continuous carbonization step and before the graphitizing step was 31%.

Example 40

The various evaluations were carried out on a graphite film which had been prepared in a manner similar to that of Example 21 except that the pressure of the pressurization in the film thickness direction was adjusted to 12 g/cm$^2$. Results are shown in Table 5. Note that a weight loss ratio of the carbonaceous film after the continuous carbonization step and before the graphitizing step was 38%.

Example 41

The various evaluations were carried out on a graphite film which had been prepared in a manner similar to that of Example 40 except that the temperatures of the heating spaces were set to 600° C. Results are shown in Table 5. Note that a weight loss ratio of the carbonaceous film after the continuous carbonization step and before the graphitizing step was 11%.

Example 42

The various evaluations were carried out on a graphite film which had been prepared in a manner similar to that of Example 1 except that, as a raw material, a raw material carbonaceous film prepared in Example 41 was used which had a thickness of 75 μm and a width of 190 mm. Results are shown in Table 5. Note that a weight loss ratio of the carbonaceous film after the continuous carbonization step and before the graphitizing step was 30%.

Comparative Example 7

The various evaluations were carried out on a graphite film which had been prepared in a manner similar to that of Example 42 except that no load was applied. Results are shown in Table 5. Note that a weight loss ratio of the carbonaceous film after the continuous carbonization step and before the graphitizing step was 30%.

Example 43

The various evaluations were carried out on a graphite film which had been prepared in a manner similar to that of Example 22 except that the pressure of the pressurization in the film thickness direction was adjusted to 12 g/cm$^2$. Results are shown in Table 5. Note that a weight loss ratio of the carbonaceous film after the continuous carbonization step and before the graphitizing step was 38%.

Example 44

The various evaluations were carried out on a graphite film which had been prepared in a manner similar to that of Example 23 except that the pressure of the pressurization in the film thickness direction was adjusted to 12 g/cm$^2$. Results are shown in Table 5. Note that a weight loss ratio of the carbonaceous film after the continuous carbonization step and before the graphitizing step was 38%.

Example 45

The various evaluations were carried out on a graphite film which had been prepared in a manner similar to that of Example 24 except that the pressure of the pressurization in the film thickness direction was adjusted to 12 g/cm$^2$. Results are shown in Table 5. Note that a weight loss ratio of the carbonaceous film after the continuous carbonization step and before the graphitizing step was 11%.

Example 46

The various evaluations were carried out on a graphite film which had been prepared in a manner similar to that of Example 25 except that the pressure of the pressurization in the film thickness direction was adjusted to 12 g/cm$^2$. Results are shown in Table 6. Note that a weight loss ratio of the carbonaceous film after the continuous carbonization step and before the graphitizing step was 11%.

Example 47

The various evaluations were carried out on a graphite film which had been prepared in a manner similar to that of Example 1 except that, as a raw material, a raw material carbonaceous film prepared in Example 46 was used which had a thickness of 75 μm and a width of 190 mm. Results are shown in Table 6. Note that a weight loss ratio of the carbonaceous film after the continuous carbonization step and before the graphitizing step was 30%.

Comparative Example 8

The various evaluations were carried out on a graphite film which had been prepared in a manner similar to that of Example 47 except that no load was applied. Results are shown in Table 6. Note that a weight loss ratio of the carbonaceous film after the continuous carbonization step and before the graphitizing step was 30%.

Example 48

The various evaluations were carried out on a graphite film which had been prepared in a manner similar to that of Example 26 except that the pressure of the pressurization in the film thickness direction was adjusted to 2.4 g/cm$^2$. Results are shown in Table 6. Note that a weight loss ratio of the carbonaceous film after the continuous carbonization step and before the graphitizing step was 38%.

Example 49

The various evaluations were carried out on a graphite film which had been prepared in a manner similar to that of Example 27 except that the pressure of the pressurization in the film thickness direction was adjusted to 3 g/cm$^2$. Results are shown in Table 6. Note that a weight loss ratio of the carbonaceous film after the continuous carbonization step and before the graphitizing step was 38%.

Example 50

The various evaluations were carried out on a graphite film which had been prepared in a manner similar to that of Example 28 except that the pressure of the pressurization in the film thickness direction was adjusted to 12 g/cm$^2$. Results are shown in Table 6. Note that a weight loss ratio of the carbonaceous film after the continuous carbonization step and before the graphitizing step was 38%.

Example 51

The various evaluations were carried out on a graphite film which had been prepared in a manner similar to that of Example 29 except that the pressure of the pressurization in the film thickness direction was adjusted to 12 g/cm². Results are shown in Table 6. Note that a weight loss ratio of the carbonaceous film after the continuous carbonization step and before the graphitizing step was 38%.

Comparative Example 9

The various evaluations were carried out on a graphite film which had been prepared in a manner similar to that of Comparative Example 4 except that the temperatures of the heating spaces were set to 810° C., the tensile strength was adjusted to 410 kgf/cm², and the pressure of pressurization in the film thickness direction was adjusted to 12 g/cm². Results are shown in Table 6. Note that a weight loss ratio of the carbonaceous film after the continuous carbonization step and before the graphitizing step was 38%.

Comparative Example 10

The various evaluations were carried out on a graphite film which had been prepared in a manner similar to that of Comparative Example 5 except that set temperatures of the heating spaces were adjusted to 550° C., 600° C., 650° C., 750° C., 800° C., and 850° C., respectively. Results are shown in Table 6. Note that a weight loss ratio of the carbonaceous film after the continuous carbonization step and before the graphitizing step was 39%.

Comparative Example 11

The various evaluations were carried out on a graphite film which had been prepared in a manner similar to that of Comparative Example 6 except that set temperatures of the heating spaces were adjusted to 500° C., 550° C., 600° C., 650° C., 750° C., and 800° C., respectively. Results are shown in Table 6. Note that a weight loss ratio of the carbonaceous film after the continuous carbonization step and before the graphitizing step was 38%.

TABLE 1

| | Raw Material | | | Continuous Carbonization Step Temperature of zone (Weight retention with respect to raw material film) | | | | | | | | | | | |
|---|---|---|---|---|---|---|---|---|---|---|---|---|---|---|---|
| | | | Thic. | Wid. | Pressurized or not in the film thickness direction | | | | | | | | | | |
| | Resin | Birf. | μm | mm | 1 | 2 | 3 | 4 | 5 | 6 | 7 | 8 | 9 | 10 | 11 |
| Example 1 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 2 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 3 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 4 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 5 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 6 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 7 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 8 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 9 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 10 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 11 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |
| Example 12 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. |

| | Continuous Carbonization Step | | | | | | | |
|---|---|---|---|---|---|---|---|---|
| | T.S. kgf/cm² | Pressure g/cm² | T. by F. kgf/cm² | Total T. kgf/cm² | Wri. | Bre. | T. Df. cm²/s | Flt. |
| Example 1 | 30 | 2 | 18 | 48 | A | A | 8.0 | A |
| Example 2 | 30 | 0.1 | 0.9 | 30.9 | D | C | 8.0 | D |
| Example 3 | 30 | 0.5 | 4.5 | 34.5 | C | B | 8.0 | C |
| Example 4 | 30 | 1 | 9 | 39 | B | A | 8.0 | B |
| Example 5 | 30 | 5 | 45 | 75 | A | A | 8.0 | A |

TABLE 1-continued

| | | | | | | | | | |
|---|---|---|---|---|---|---|---|---|---|
| Example 6 | 30 | 10 | 90 | 120 | A | B | 8.0 | A |
| Example 7 | 30 | 20 | 180 | 210 | A | C | 8.0 | A |
| Example 8 | 1 | 2 | 18 | 19 | C | B | 8.0 | C |
| Example 9 | 5 | 2 | 18 | 23 | B | A | 8.0 | B |
| Example 10 | 70 | 2 | 18 | 88 | A | B | 8.0 | A |
| Example 11 | 200 | 2 | 18 | 218 | A | C | 8.0 | A |
| Example 12 | 400 | 2 | 18 | 418 | B | D | 8.0 | B |

Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized

TABLE 2

| | Raw Material | | | | Continuous Carbonization Step Temperature of zone (Weight retention with respect to raw material film) Pressurized or not in the film thickness direction | | | | | | | | | | | |
|---|---|---|---|---|---|---|---|---|---|---|---|---|---|---|---|---|
| | Resin | Birf. | Thic. μm | Wid. mm | 1 | 2 | 3 | 4 | 5 | 6 | 7 | 8 | 9 | 10 | 11 | |
| Example 13 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 14 | B | 0.10 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 15 | C | 0.10 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 16 | A | 0.14 | 50 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 17 | A | 0.14 | 75 | 100 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 18 | A | 0.14 | 75 | 250 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 19 | A | 0.14 | 75 | 200 | 550 (97%) Press. | 25 | 600 (89%) Press. | 25 | 650 (73%) Press. | 25 | 700 (69%) Press. | | | | | |
| Example 20 | A | 0.14 | 75 | 200 | 550 (97%) Press. | 600 (89%) Press. | 650 (73%) Press. | 700 (69%) | | | | | | | | |
| Example 21 | A | 0.14 | 75 | 200 | 800 (62%) Press. | | | | | | | | | | | |
| Example 22 | B | 0.10 | 75 | 200 | 800 (62%) Press. | | | | | | | | | | | |
| Example 23 | C | 0.10 | 75 | 200 | 800 (62%) Press. | | | | | | | | | | | |
| Example 24 | B | 0.10 | 75 | 200 | 800 (89%) Press. | | | | | | | | | | | |

| | Continuous Carbonization Step | | | | | | | |
|---|---|---|---|---|---|---|---|---|
| | T.S. kgf/cm² | Pressure g/cm² | T. by F. kgf/cm² | Total T. kgf/cm² | Wri. | Bre. | T. Df. cm²/s | Flt. |
| Example 13 | 70 | 0.5 | 4.5 | 74.5 | B | B | 8.0 | B |
| Example 14 | 30 | 2 | 18 | 48 | A | A | 1.0 | A |
| Example 15 | 30 | 2 | 18 | 48 | A | A | 1.0 | A |
| Example 16 | 30 | 2 | 18 | 48 | A | A | 8.0 | A |
| Example 17 | 30 | 2 | 18 | 48 | A | A | 8.0 | A |
| Example 18 | 30 | 2 | 18 | 48 | A | A | 8.0 | A |

TABLE 2-continued

| | | | | | | | | |
|---|---|---|---|---|---|---|---|---|
| Example 19 | 30 | 2 | 12 | 42 | A | A | 8.2 | A |
| Example 20 | 30 | 2 | 12 | 42 | B | B | 7.5 | B |
| Example 21 | 30 | 2 | 3 | 33 | C | C | 4.2 | C |
| Example 22 | 30 | 2 | 3 | 33 | C | C | 1.0 | C |
| Example 23 | 30 | 2 | 3 | 33 | C | C | 0.8 | C |
| Example 24 | 30 | 2 | 3 | 33 | A | A | 8.0 | — |

Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized

TABLE 3

| | Raw Material | | | Continuous Carbonization Step Temperature of zone (Weight retention with respect to raw material film) | | | | | | | | | | | | |
|---|---|---|---|---|---|---|---|---|---|---|---|---|---|---|---|---|
| | | Thic. | Wid. | Pressurized or not in the film thickness direction | | | | | | | | | | | | |
| | Resin | Birf. | μm | mm | 1 | 2 | 3 | 4 | 5 | 6 | 7 | 8 | 9 | 10 | 11 | |
| Example 25 | C | 0.10 | 75 | 200 | 600 (89%) Press. | | | | | | | | | | | |
| Example 26 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) N.P. | |
| Example 27 | A | 0.14 | 75 | 200 | 550 (97%) Press. | 25 | 600 (89%) Press. | 25 | 650 (73%) Press. | 25 | 700 (69%) Press. | 25 | 750 (65%) N.P. | 25 | 800 (62%) N.P. | |
| Example 28 | A | 0.14 | 75 | 200 | 550 (97%) N.P. | 25 | 600 (89%) N.P. | 25 | 650 (73%) N.P. | 25 | 700 (69%) Press. | 25 | 750 (65%) N.P. | 25 | 800 (62%) N.P. | |
| Example 29 | A | 0.14 | 75 | 200 | 550 (97%) N.P. | 25 | 600 (89%) N.P. | 25 | 650 (73%) Press. | 25 | 700 (69%) N.P. | 25 | 750 (65%) N.P. | 25 | 800 (62%) N.P. | |
| Example 30 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 31 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 32 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 33 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |
| Example 34 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) Press. | |

| | Continuous Carbonization Step | | | | | | | |
|---|---|---|---|---|---|---|---|---|
| | T.S. kgf/cm² | Pressure g/cm² | T. by F. kgf/cm² | Total T. kgf/cm² | Wri. | Bre. | T. Df. cm²/s | Flt. |
| Example 25 | 30 | 2 | 18 | 48 | A | A | 8.0 | — |
| Example 26 | 30 | 2 | 15 | 45 | B | A | 8.0 | B |
| Example 27 | 30 | 2 | 12 | 42 | B | A | 8.0 | B |
| Example 28 | 30 | 2 | 3 | 33 | D | B | 8.0 | D |
| Example 29 | 30 | 2 | 3 | 33 | D | B | 8.0 | D |
| Example 30 | 0 | 45 | 405 | 405 | B | D | 8.0 | A |
| Example 31 | 0 | 23 | 207 | 207 | D | B | 8.0 | D |
| Example 32 | 0 | 0.1 | 0.9 | 0.9 | D | B | 8.0 | D |

TABLE 3-continued

| | | | | | | | | |
|---|---|---|---|---|---|---|---|---|
| Example 33 | 0 | 0.5 | 4.5 | 4.5 | C | B | 8.0 | C |
| Example 34 | 4 | 0.1 | 0.9 | 4.9 | C | B | 8.0 | C |

Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized
N.P.: Not Pressurized

TABLE 4

| | Raw Material | | | | Continuous Carbonization Step Temperature of zone (Weight retention with respect to raw material film) | | | | | | | | | | | |
|---|---|---|---|---|---|---|---|---|---|---|---|---|---|---|---|---|
| | | | Thic. | Wid. | Pressurized or not in the film thickness direction | | | | | | | | | | | |
| | Resin | Birf. | μm | mm | 1 | 2 | 3 | 4 | 5 | 6 | 7 | 8 | 9 | 10 | 11 | |
| Com. Ex. 1 *1 | B | 0.10 | 50 | 50 | 1000 (50%) N.P. | — | — | — | — | — | — | — | — | — | — | |
| Com. Ex. 2 *2 | C | 0.10 | 50 | 50 | 800 (62%) N.P. | — | — | — | — | — | — | — | — | — | — | |
| Com. Ex. 3 | A | 0.14 | 75 | 200 | 550 (97%) N.P. | 25 | 600 (89%) N.P. | 25 | 650 (73%) N.P. | 25 | 700 (69%) N.P. | 25 | 750 (65%) N.P. | 25 | 800 (62%) N.P. | |
| Com. Ex. 4 | A | 0.14 | 75 | 200 | 800 (62%) N.P. | | | | | | | | | | | |
| Com. Ex. 5 | A | 0.14 | 75 | 200 | 550 (97%) N.P. | 25 | 600 (89%) N.P. | 25 | 650 (73%) N.P. | 25 | 700 (69%) N.P. | 25 | 750 (65%) N.P. | 25 | 850 (61%) Press. | |
| Com. Ex. 6 | A | 0.14 | 75 | 200 | 500 (99%) Press. | 25 | 600 (89%) N.P. | 25 | 650 (73%) N.P. | 25 | 700 (69%) N.P. | 25 | 750 (65%) N.P. | 25 | 800 (62%) N.P. | |

| | Continuous Carbonization Step | | | | | | | |
|---|---|---|---|---|---|---|---|---|
| | T.S. kgf/cm² | Pressure g/cm² | T. by F. kgf/cm² | Total T. kgf/cm² | Wri. | Bre. | T. Df. cm²/s | Flt. |
| Com. Ex. 1 *1 | 2 | 0 | 0 | 2 | E | C | 1.0 | E |
| Com. Ex. 2 *2 | 0.1 | 0 | 0 | 0.1 | E | C | 0.8 | E |
| Com. Ex. 3 | 30 | 0 | 0 | 30 | E | C | 8.0 | E |
| Com. Ex. 4 | 30 | 0 | 0 | 30 | E | C | 4.2 | E |
| Com. Ex. 5 | 30 | 2 | 3 | 33 | E | D | 8.0 | E |
| Com. Ex. 6 | 30 | 2 | 3 | 33 | E | C | 8.0 | E |

Com. Ex.: Comparative Example
Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized
N.P.: Not Pressurized
*1: Cited Reference P, JP4-149013, Example 1
*2: Cited Reference KANEKA, JP2004-299937, Example 2

TABLE 5

| | Raw Material | | | | Continuous Carbonization Step Temperature of zone (Weight retention with respect to raw material film) Pressurized or not in the film thickness direction | | | | | | | | | | |
|---|---|---|---|---|---|---|---|---|---|---|---|---|---|---|---|
| | Resin | Birf. | Thic. μm | Wid. mm | 1 | 2 | 3 | 4 | 5 | 6 | 7 | 8 | 9 | 10 | 11 |
| Example 35 | A | 0.14 | 75 | 200 | 550 (97%) Press. | 25 | 600 (89%) Press. | 25 | 650 (73%) Press. | 25 | 700 (69%) Press. | | | | |
| Example 36 | A | 0.14 | 75 | 200 | 550 (97%) Press. | 600 (89%) Press. | 650 (73%) Press. | 700 (69%) Press. | | | | | | | |
| Example 37 | A | 0.14 | 75 | 200 | 550 (97%) Press. | 600 (89%) Press. | 650 (73%) Press. | 25 | 700 (69%) Press. | | | | | | |
| Example 38 | A | 0.14 | 75 | 200 | 550 (97%) Press. | 25 | 600 (89%) Press. | 650 (73%) Press. | 700 (69%) Press. | | | | | | |
| Example 39 | A | 0.14 | 75 | 200 | 550 (97%) Press. | 600 (89%) Press. | 25 | 650 (73%) Press. | 700 (69%) Press. | | | | | | |
| Example 40 | A | 0.14 | 75 | 200 | 600 (62%) Press. | | | | | | | | | | |
| Example 41 | A | 0.14 | 75 | 200 | 600 (89%) Press. | | | | | | | | | | |
| Example 42 | Film *1 | | 75 | 190 | 550 (100%) Press. | 25 | 600 (100%) Press. | 25 | 650 (82%) Press. | 25 | 700 (78%) Press. | 25 | 750 (73%) Press. | 25 | 800 (70%) Press. |
| Com. Ex. 7 | Film *1 | | 75 | 190 | 550 (100%) N.P. | 25 | 600 (100%) N.P. | 25 | 650 (82%) N.P. | 25 | 700 (78%) N.P. | 25 | 750 (73%) N.P. | 25 | 800 (70%) N.P. |
| Example 43 | B | 0.10 | 75 | 200 | 800 (62%) Press. | | | | | | | | | | |
| Example 44 | C | 0.10 | 75 | 200 | 800 (62%) Press. | | | | | | | | | | |
| Example 45 | B | 0.10 | 75 | 200 | 600 (89%) Press. | | | | | | | | | | |

| | Continuous Carbonization Step | | | | | | | |
|---|---|---|---|---|---|---|---|---|
| | T.S. kgf/cm$^2$ | Pressure g/cm$^2$ | T. by F. kgf/cm$^2$ | Total T. kgf/cm$^2$ | Wri. | Bre. | T. Df. cm$^2$/s | Flt. |
| Example 35 | 30 | 3 | 18 | 48 | A | A | 8.2 | A |
| Example 36 | 30 | 3 | 18 | 48 | A | B | 7.5 | A |
| Example 37 | 30 | 3 | 18 | 48 | A | B | 7.7 | A |
| Example 38 | 30 | 3 | 18 | 48 | A | B | 7.7 | A |
| Example 39 | 30 | 3 | 18 | 48 | A | B | 7.7 | B |
| Example 40 | 30 | 12 | 18 | 48 | B | C | 4.2 | B |
| Example 41 | 30 | 12 | 18 | 48 | A | A | 3.0 | D |
| Example 42 | 30 | 2 | 19 | 49 | A | A | 7.5 | A |
| Com. Ex. 7 | 30 | 0 | 0 | 30 | D | C | 7.5 | D |
| Example 43 | 30 | 12 | 18 | 48 | B | C | 1.0 | B |
| Example 44 | 30 | 12 | 18 | 48 | B | C | 0.8 | B |
| Example 45 | 30 | 12 | 18 | 48 | A | A | 8.0 | D |

Com. Ex.: Comparative Example
Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized
N.P.: Not Pressurized
Film *1: Raw material carbonaceous film prepared in Example 41

TABLE 6

| | Raw Material | | | | Continuous Carbonization Step Temperature of zone (Weight retention with respect to raw material film) Pressurized or not in the film thickness direction | | | | | | | | | | | |
|---|---|---|---|---|---|---|---|---|---|---|---|---|---|---|---|---|
| | Resin | Birf. | Thic. μm | Wid. mm | 1 | 2 | 3 | 4 | 5 | 6 | 7 | 8 | 9 | 10 | 11 | |
| Example 46 | C | 0.10 | 75 | 200 | 600 (89%) Press. | | | | | | | | | | | |
| Example 47 | Film *1 | | 75 | 190 | 550 (100%) Press. | 25 | 600 (100%) Press. | 25 | 650 (82%) Press. | 25 | 700 (78%) Press. | 25 | 750 (73%) Press. | 25 | 800 (70%) Press. | |
| Com. Ex. 8 | Film *1 | | 75 | 190 | 550 (100%) N.P. | 25 | 600 (100%) N.P. | 25 | 650 (82%) N.P. | 25 | 700 (78%) N.P. | 25 | 750 (73%) N.P. | 25 | 800 (70%) N.P. | |
| Example 48 | A | 0.14 | 75 | 200 | 550 (97%) Press. | 25 | 600 (89%) Press. | 25 | 650 (73%) Press. | 25 | 700 (69%) Press. | 25 | 750 (65%) Press. | 25 | 800 (62%) N.P. | |
| Example 49 | A | 0.14 | 75 | 200 | 550 (97%) Press. | 25 | 600 (89%) Press. | 25 | 650 (73%) Press. | 25 | 700 (69%) Press. | 25 | 750 (65%) N.P. | 25 | 800 (62%) N.P. | |
| Example 50 | A | 0.14 | 75 | 200 | 550 (97%) N.P. | 25 | 600 (89%) N.P. | 25 | 650 (73%) N.P. | 25 | 700 (69%) Press. | 25 | 750 (65%) N.P. | 25 | 800 (62%) N.P. | |
| Example 51 | A | 0.14 | 75 | 200 | 550 (97%) N.P. | 25 | 600 (89%) N.P. | 25 | 650 (73%) Press. | 25 | 700 (69%) N.P. | 25 | 750 (65%) N.P. | 25 | 800 (62%) N.P. | |
| Com. Ex. 9 | A | 0.14 | 75 | 200 | 810 (62%) Press. | | | | | | | | | | | |
| Com. Ex. 10 | A | 0.14 | 75 | 200 | 550 (97%) N.P. | 25 | 600 (89%) N.P. | 25 | 650 (73%) N.P. | 25 | 750 (65%) N.P. | 25 | 800 (62%) N.P. | 25 | 850 (61%) Press. | |
| Com. Ex. 11 | A | 0.14 | 75 | 200 | 500 (99%) Press. | 25 | 550 (97%) N.P. | 25 | 600 (89%) N.P. | 25 | 650 (73%) N.P. | 25 | 750 (65%) N.P. | 25 | 800 (62%) N.P. | |

| | Continuous Carbonization Step | | | | | | | |
|---|---|---|---|---|---|---|---|---|
| | T.S. kgf/cm$^2$ | Pressure g/cm$^2$ | T. by F. kgf/cm$^2$ | Total T. kgf/cm$^2$ | Wri. | Bre. | T. Df. cm$^2$/s | Flt. |
| Example 46 | 30 | 12 | 18 | 48 | A | A | 8.0 | D |
| Example 47 | 30 | 2 | 19 | 49 | A | A | 0.9 | A |
| Com. Ex. 8 | 30 | 0 | 0 | 30 | D | C | 0.9 | D |
| Example 48 | 30 | 2.4 | 18 | 48 | B | A | 8.0 | B |
| Example 49 | 30 | 3 | 18 | 48 | B | A | 8.0 | B |
| Example 50 | 30 | 12 | 18 | 48 | C | C | 8.0 | C |
| Example 51 | 30 | 12 | 18 | 48 | C | B | 8.0 | C |
| Com. Ex. 9 | 410 | 12 | 18 | 428 | B | D | 4.2 | B |
| Com. Ex. 10 | 30 | 2 | 3 | 33 | E | D | 8.0 | E |
| Com. Ex. 11 | 30 | 2 | 3 | 33 | E | C | 8.0 | E |

Com. Ex.: Comparative Example
Birf.: Birefringence
Thic.: Thickness
Wid.: Width
T.S.: Tensile Strength
T. by F.: Tension by Friction
Total T.: Total Tension
Wri.: Wrinkles (Winding up test)
Bre.: Breakage
T. Df.: Thermal Diffusivity of Graphite Film
Flt.: Flatness of Graphite Film
Press.: Pressurized
N.P.: Not Pressurized
Film *1: Raw material carbonaceous film prepared in Example 46

Note that the "weight retention" in Tables 1 through 6 is a value obtained by subtracting a weight loss ratio of each of the heating spaces from a weight (which is 100%) of the film before the continuous carbonization step.

<Effect of Pressurization in Film Thickness Direction>

The following compares Examples 1 through 51 with Comparative Examples 1 through 6, 10, and 11. In Comparative Examples 1 through 6, a number of large wrinkles were caused on the films, and each of the films could not be wound around the cardboard tube. On the other hand, in Examples 1 through 51 in which the pressurization in the film thickness direction was carried out within the temperature profile of 550° C. or higher and 800° C. or lower, wrinkling was inhibited under any of the conditions. In particular, it is shown in Examples 1 through 7 that the effect of inhibiting wrinkling is greater when the pressure of pressurization is 5 g/cm$^2$ or higher. It is shown in Examples 1 and 21 that wrinkling can be inhibited by carrying out the heating treatment in stages. Further, it is shown in Examples 26 through 29 and Comparative Example 3 that wrinkling can be inhibited even by applying pressure in the thickness direction only at some of the temperatures. Moreover, it is shown from Example 1, Comparative Examples 5, 6, 10, and 11 that the pressurization in the film thickness direction, which is carried out at a temperature profile that does not fall within the range of 550° C. or higher and 800° C. or lower, is not effective for inhibiting wrinkling.

Furthermore, according to a comparison between (i) Examples 20 through 23 and 29 and (ii) Examples 40, 43, 44, and 51, an effect of inhibiting wrinkling tends to be greater as the pressure of pressurization increases.

<Flatness>

It is shown in Examples 1 through 23, 26 through 29, 31 through 40, 43, 44, and 48 through 51, and Comparative Examples 1 through 6 that the evaluations of wrinkles of the carbonaceous films substantially conform to flatnesses of the graphite films. That is, it shows that the graphite film made from the carbonaceous film in which wrinkling are inhibited has favorable flatness. Moreover, in Example 30, the evaluation of wrinkles of the carbonaceous film substantially conforms to the flatness of the graphite film.

Note that, as in Examples 41, 45, and 46, in the case where the temperatures of the heating spaces are set to only 600° C., the flatness of the graphite film is inferior even though the evaluation of wrinkles is favorable. Even in such cases, the flatness of the graphite film is improved by further carrying out the continuous carbonization step as in Examples 42 and 47. Note that, in the case where the pressurization is not carried out as in Comparative Examples 7 and 8, the flatness of the graphite film is not improved.

<Effect of Tensile Strength>

The tensile strength is compared between Example 1 and 8 through 12. In any of the cases, the effect of inhibiting wrinkling and the breakage occurrence frequency is favorable. In particular, in a case where the tensile strength is 30 kgf/cm$^2$ or higher and 200 kgf/cm$^2$ or lower, the effect of inhibiting wrinkling is greater. Moreover, it is shown that the film is broken more easily as the tensile strength increases.

Further, according to a comparison between Examples 3 and 13, the effect of inhibiting wrinkling becomes greater by changing the tensile strength, even with similar pressure of the pressurization in the film thickness direction and without changing the breakage occurrence frequency.

Moreover, it is shown in Examples 30 through 33 that, according to the method for manufacturing a carbonaceous film and the method for manufacturing a graphite film of the present invention, wrinkling and breakage are inhibited even when the tensile strength is 0 kgf/cm$^2$.

<Effect of Tension by Friction>

From a comparison between Examples 1 through 7 or between Examples 30 through 33 in which the tension by friction is different, it is shown that, in particular, a breakage occurrence frequency can be reduced in a case where the tension by friction is 0.9 kgf/cm$^2$ or higher and 207 kgf/cm$^2$ or lower. Moreover, in a case where the tension by friction is 4.5 kgf/cm$^2$ or higher and 180 kgf/cm$^2$ or lower, wrinkling can be further inhibited without changing the breakage occurrence frequency. In particular, in a case where the tensile strength is 30 kgf/cm$^2$ or higher and 70 kgf/cm$^2$ or lower and the tension by friction is 9 kgf/cm$^2$ or higher and 90 kgf/cm$^2$ or lower, an excellent effect can be brought about in terms of inhibition of wrinkling and breakage occurrence frequency.

Moreover, from a comparison between Examples 1 through 13 and Examples 30 through 34 which are under the identical conditions of raw material, of temperatures in the respective zones, and of whether or not to carry out the pressurization, it is shown that a particularly excellent effect can be brought about in terms of inhibition of wrinkling and breakage occurrence frequency, in a case where the tensile strength is 30 kgf/cm$^2$ or higher and 70 kgf/cm$^2$ or lower, the tension by friction is 9 kgf/cm$^2$ or higher and 90 kgf/cm$^2$ or lower, and a total of the tensile strength and the tension by friction is 39 kgf/cm$^2$ or higher and 120 kgf/cm$^2$ or lower.

Note that, from a comparison between Example 1, Examples 35 through 41, and Examples 48 through 51 which are under the identical conditions of raw material, of tensile strength, and of tension by friction, it is shown that wrinkling and breakage are favorably inhibited even in a case where the configurations of the heating spaces are changed within the set temperature profile of 550° C. or higher and 800° C. or lower.

<Effect of Birefringence>

From Examples 1, 14, 15, and 21 through 25 in which the birefringence of the raw material film is different, it is shown that the carbonaceous film and the graphite film in which wrinkling is inhibited can be obtained in a case where the pressurization in the film thickness direction is carried out on the polymeric film which is used as the raw material and has the birefringence of 0.08 or higher with which the graphite film can be easily obtained.

From Examples 1, 14, 15, and 21 through 23, it is shown that the continuous carbonization step, in which the polymeric film having the birefringence of 0.14 or higher is used as the raw material, is suitable as a process to be carried out before the graphitizing step in the batch method for manufacturing a graphite film having a high thermal diffusivity.

Moreover, from Examples 14, 15, and 22 through 25, it is shown that the graphite film having a high thermal diffusivity can be obtained by combining the continuous carbonization step and the batch carbonization step and by using the polymeric film having the birefringence of 0.08 or higher and lower than 0.14.

INDUSTRIAL APPLICABILITY

The methods of the present invention for manufacturing a carbonaceous film and for manufacturing a graphite film are suitably applicable to, for example, production of a carbonaceous film and of a graphite film by heat-treating a polymeric film in a continuous production method.

REFERENCE SIGNS LIST

11: Film after a continuous carbonization step
21: Heating treatment device 22: Film transporting device
23: Film made up of a polymeric film and/or a raw material carbonaceous film
24: Carbonaceous film
31: Physically separated heating spaces
32: Heating spaces which are not physically separated
33: Heating space 1
34: Heating space 2
35: Heating space 3
36: Furnace body
37: Polymeric film and/or a raw material carbonaceous film, and/or a carbonaceous film
41: Case where no cooling space is provided
42: Case where cooling spaces are provided
43: Cooling space
51: Hearth
52: Weight
61: Scroll of carbonaceous film
62: Hearth
63: Gravitational direction

The invention claimed is:

1. A method for manufacturing a carbonaceous film with use of a continuous carbonization apparatus, said method comprising the step of:
transporting a polymeric film and/or a raw material carbonaceous film, of which the carbonaceous film is to be made, at a temperature of 550° C. to 800° C., while applying pressure to the polymeric film and/or the raw material carbonaceous film in a film thickness direction, so that the pressure causes a friction on the polymeric film and/or the raw material carbonaceous film, wherein
the raw material carbonaceous film has been obtained by heat-treating the polymeric film,
the polymeric film and/or the raw material carbonaceous film is pressured in a planar manner,
the pressure applied to the polymeric film and/or the raw material carbonaceous film in the film thickness direction is 1 g/cm$^2$ or higher and 20 g/cm$^2$ or lower,
i) a transporting force for said transporting the polymeric film and/or the raw material carbonaceous film and ii) a pulling force are applied to the polymeric film and/or the raw material carbonaceous film,
the transporting force is applied to the polymeric film and/or the raw material carbonaceous film in a direction in which the polymeric film and/or the raw material carbonaceous film is transported, and
the pulling force is 5 kgf/cm$^2$ or higher and 200 kgf/cm$^2$ or lower, and is applied to the polymeric film and/or the raw material carbonaceous film in a direction opposite to the direction in which the transporting force is applied.

2. The method as set forth in claim 1, wherein
a tension is applied to the polymeric film and/or the raw material carbonaceous film,
the tension is applied to the polymeric film and/or the raw material carbonaceous film so that the polymeric film and/or the raw material carbonaceous film is tensioned, a direction in which the force for providing tension is applied being opposite to the direction in which the transporting force is applied, and
the transporting force is greater than the tension so that the polymeric film and/or the raw material carbonaceous film is transported in the direction in which the transporting force is applied.

3. The method as set forth in claim 1, wherein the pressure is applied, by a load of a weight, to the polymeric film and/or the raw material carbonaceous film in the film thickness direction.

4. The method of claim 1 further comprising the step of:
graphitizing the carbonaceous film at a temperature of 2400° C. or higher.

5. The method as set forth in claim 1, wherein the polymeric film has birefringence of 0.08 or higher.

6. The method as set forth in claim 1, wherein the polymeric film is formed of at least one polymer selected from the group consisting of polyimide, polyoxadiazole, polybenzothiazole, polybenzobisazole, polybenzoxazole, polybenzobisoxasole, polyparaphenylene vinylene, polybenzobisimidazole, and polythiazole.

7. The method as set forth in claim 1, wherein the pressure is 1 g/cm$^2$ or higher and 10 g/cm$^2$ or lower, and the pulling force is 5 kgf/cm$^2$ or higher and 70 kgf/cm$^2$ or lower.

8. The method as set forth in claim 1, wherein the friction caused by the pressure are applied to the polymeric film and/or the raw material carbonaceous film,
the friction in a direction opposite to the direction in which the polymeric film and/or the raw material carbonaceous film is transported, and
the friction is 9 kgf/cm$^2$ or higher and 180 kgf/cm$^2$ or lower.

* * * * *